US 6,491,224 B2

(12) United States Patent
Ohkawa et al.

(10) Patent No.: US 6,491,224 B2
(45) Date of Patent: *Dec. 10, 2002

(54) OPTICAL SCANNING APPARATUS

(75) Inventors: Masanori Ohkawa, Kawasaki (JP); Toshiyuki Ichikawa, Atsugi (JP); Hiroshi Watanuki, Machida (JP); Kozo Yamazaki, Hatano (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/418,514

(22) Filed: Oct. 15, 1999

(65) Prior Publication Data

US 2002/0043564 A1 Apr. 18, 2002

(30) Foreign Application Priority Data

Apr. 26, 1999 (JP) .............................. 11-118583

(51) Int. Cl.[7] .................................. G06K 7/10
(52) U.S. Cl. .............................. 235/462.4; 235/462.37; 235/462.28
(58) Field of Search ..................... 235/462.01, 462.36, 235/462.21, 462.33, 477, 462.28, 462.4

(56) References Cited

U.S. PATENT DOCUMENTS

| 5,206,491 | A | | 4/1993 | Katoh et al. |
| 5,229,588 | A | | 7/1993 | Detwiler et al. |
| 5,293,033 | A | * | 3/1994 | Yamashita .................. 235/462 |
| 5,475,207 | A | * | 12/1995 | Bobba et al. ................ 235/467 |
| 5,684,289 | A | | 11/1997 | Detwiler et al. |
| 5,705,802 | A | | 1/1998 | Bobba et al. |
| 5,801,370 | A | * | 9/1998 | Katoh et al. ................ 235/467 |
| 5,869,827 | A | * | 2/1999 | Rando ...................... 235/462.4 |
| 5,886,336 | A | * | 3/1999 | Tang et al. .................. 235/462 |
| 5,936,218 | A | | 8/1999 | Ohkawa et al. |
| 5,975,417 | A | * | 11/1999 | Spencer et al. ......... 235/462.36 |
| 6,076,735 | A | * | 6/2000 | Saegusa ................... 235/462.4 |

OTHER PUBLICATIONS

U.S. patent application Ser. No. 09/045,120, Ohkawa et al., filed Mar. 20, 1998.

* cited by examiner

Primary Examiner—Thien M. Le
Assistant Examiner—Daniel St. Cyr
(74) Attorney, Agent, or Firm—Staas & Halsey LLP

(57) ABSTRACT

An optical scanning apparatus, such as a bar code scanner, for reading 360 degrees of, e.g., tray commodities. A first scanning pattern is emitted almost in the horizontal direction to an installation surface of the apparatus, and a second scanning is pattern emitted from an upper portion to a lower portion of the apparatus, toward the installation surface, via a window provided vertical to the installation surface.

40 Claims, 21 Drawing Sheets

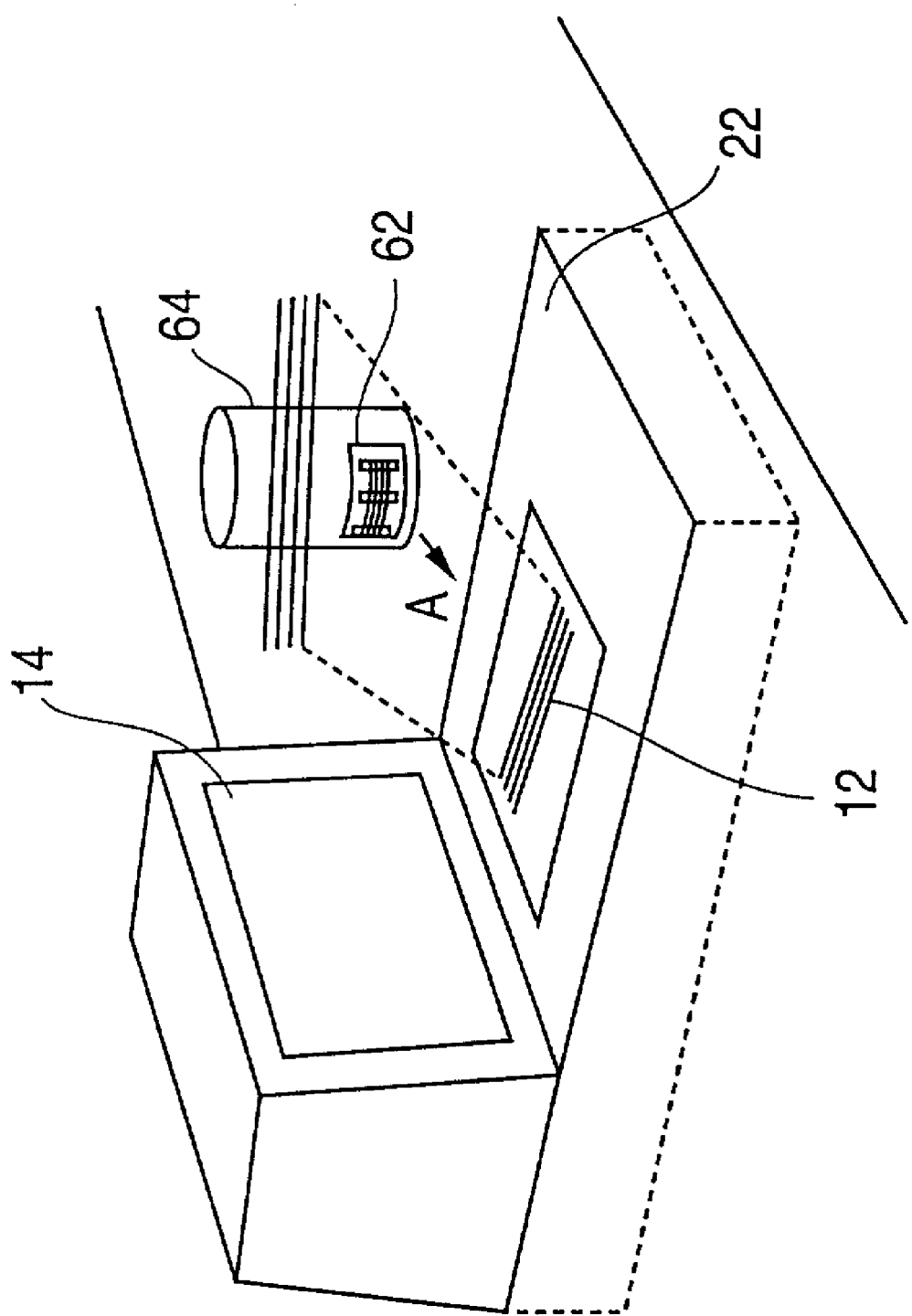

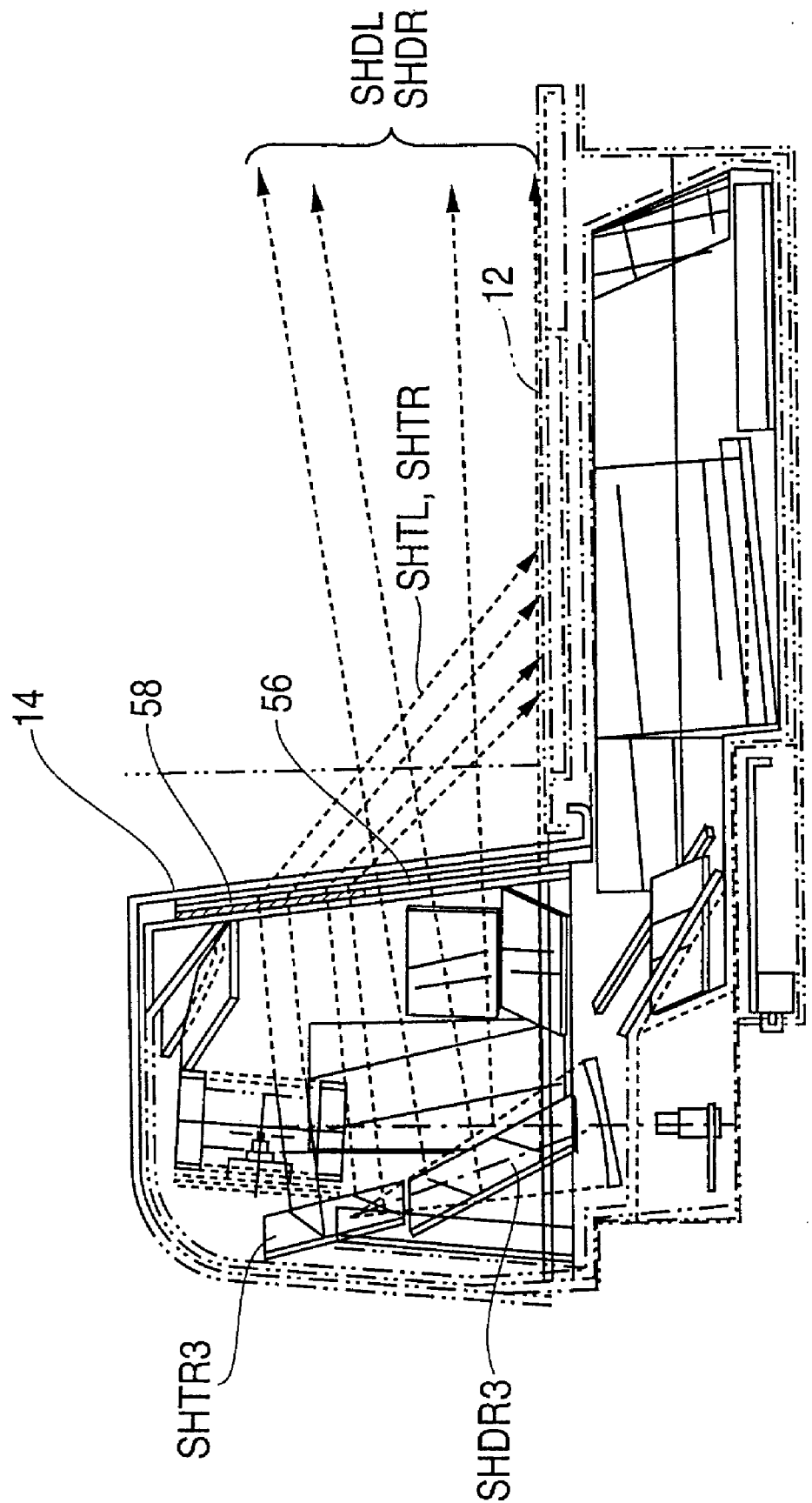

FIG. 12
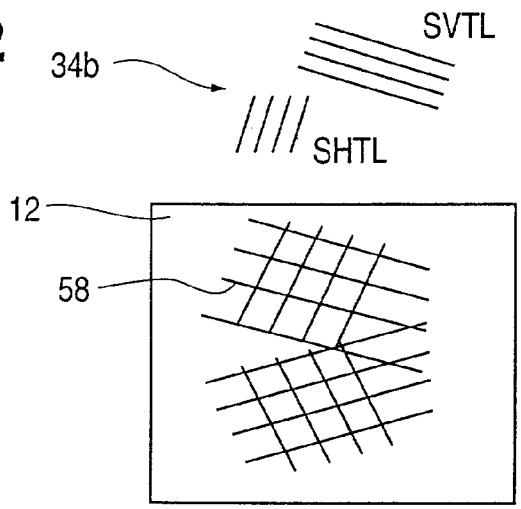
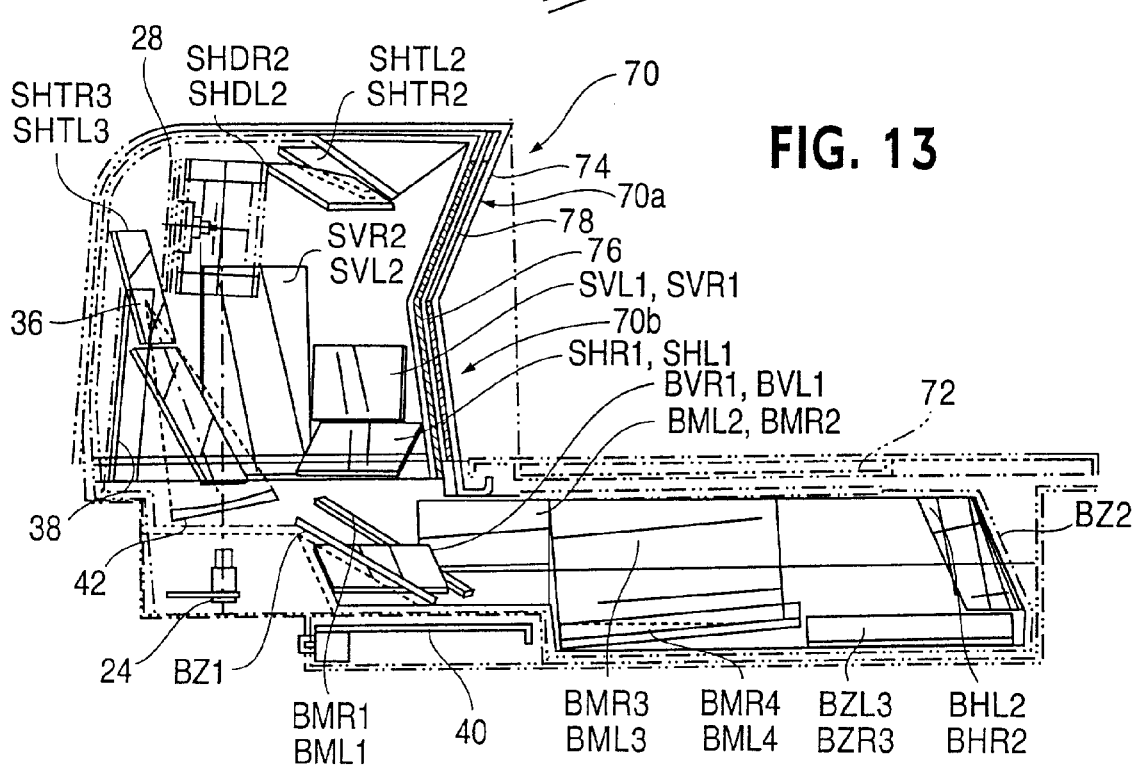
FIG. 13

OPTICAL SCANNING APPARATUS

BACKGROUND OF THE INVENTION

1. Field of the Invention

The present invention relates to an optical scanning apparatus to be used, for example, in a bar code reader. Moreover, the present invention relates to an optical reader, and particularly to a bar code reader called a multi-head scanner.

2. Description of the Related Art

Recently, point-of-sale ("POS") systems have gained widespread use, in which checkout can be conducted by reading bar code information attached to a commodity. In such a POS system, the bar code information is input by scanning the commodity and the checkout can be conducted on the basis of such information. Therefore, the workload of the checkout operator can be reduced.

In the POS system, a stationary scanner, which is installed in the checkout counter, is mainly used.

Up to now, a bar code scanner having a single reading window from which a scanning pattern is emitted has been mainly used to scan a bar code. The reading window can be installed in the horizontal direction to the counter surface or installed in the vertical direction thereto. However, in the case of such apparatus, the direction in which the bar code (direction of bar code) can be read is limited and, therefore, an operator has to direct the bar code toward the reading. This has been a problem for the operator.

In order to reduce this problem, a so-called multi-head scanner is now widely used. This scanner is provided both with a window which is parallel to the counter surface (bottom window) and a window which is vertical to the counter surface (side window), and a scanning pattern is respectively emitted from each window.

However, the multi-head scanner of the prior art has its own problems, which are explained below.

The first problem is that the apparatus usually is thick.

In Europe, the checkout operator is legally obliged to perform the job sitting down. Since the scanner is buried within a check out the counter, when the scanner is thick, a bottom of the scanner may project from the lower surface of the counter. In this case, the operator cannot accommodate his/her knees under the lower surface of the counter or manipulation flexibility of the bar code reader is deteriorated because the scanning surface becomes high, and thereby the operator's work becomes harder.

On the other hand, when an operator performs the bar code reading job while standing, such a problem may not occur. However, in some cases, a drawer is provided under the scanner to accommodate cash. In this case, when the scanner is thick, a distance from the drawer to an operator may be significant, resulting in the problem that the processing of cash may be difficult.

In light of the problem explained above, it is desirable for a scanner to have a thickness of 90 mm or less. However, actual multi-head scanners have thicknesses over 100 mm. For practical manipulation of the apparatus, a difference of thickness of about 10 mm or more is significant.

A second problem is that the multi-head scanner of the prior art is not capable of perfectly reading in 360 degrees.

A multi-head scanner preferably allows bar code reading, when the bar code is directed in any direction. That is, the scanner should be able to read the bar code information, even when the bar code is not directed to the reading window side, because the scanning patterns are emitted respectively from the bottom section and side section.

However, in the multi-head scanner of the prior art, the bar code cannot be read in some cases depending on the inclination between the bar code and the counter surface, resulting in the problem that a 360 degree reading operation cannot be assured. For example, reading is possible when the bar code is parallel to the counter surface, but reading may be impossible when the bar code is vertical to the counter surface. In this case, a perfect 360 degrees reading operation cannot be realized.

The third problem is that the multi-scanning pattern cannot be provided in some cases with a single light beam. Here, the term multi-scanning pattern is meant to represent both the scanning pattern emitted from the bottom section and the scanning pattern emitted from the side section.

In the multi-head scanner of the prior art, a plurality of light sources, for example, are provided, and the light beams from respective light sources are incident to the scanning means, such as a polygon mirror, or the like. On the other hand, the light beam emitted from a single light source is divided by a beam splitter and respective light beams are incident to the scanning means from different directions. Since the number of light beams incident to the scanning means is increased, the photo-detector for receiving the reflected light beam from the bar code and the light collecting means for inputting the reflected light beam to the photo-detector must correspond to the number of light beams. Therefore, the scanner cost may become high.

Particularly, in a shop such as a super-market, a "tray-commodity", in which a commodity is packed on the tray, may be sold. The tray is covered with wrapping material and the bar code is attached to the wrapping material.

In the case of the prior art apparatuses, a laser scanning pattern emitted from the side section is almost parallel to the bottom window, namely such laser scanning pattern is emitted almost horizontally. Meanwhile, since the tray commodity has a problem that a fluid may leak therefrom, it is desired that the tray not be tilted at the time of reading the bar code. However, since the laser scanning pattern is emitted almost horizontally, the tray must be tilted to read the car code attached on the tray commodity. If the tray is intentionally not tilted, due to the leakage concern, a probability for non-reading of the bar code is very high because the bar code attached on the tray commodity is not irradiated with the laser scanning pattern.

SUMMARY OF THE INVENTION

It is an object of the present invention to provide an optical scanning apparatus, such as a multi-head scanner, which assures almost perfect reading in 360 degrees.

Particularly, the present invention provides an optical scanning apparatus which assures accurate reading of an indicia or mark (bar code or the like) attached to a tray commodity.

In order to solve the problems explained above, the present invention includes a light source for generating a light beam, a scanning means for scanning the light beam emitted from the light source, a mirror for reflecting a scanning beam generated by the scanning means, a first window for emitting the scanning beam reflected by the mirror as the first scanning pattern, and a second window installed at an angle such that an extending line of the angle crosses an extending direction of the first window for emitting the scanning beam reflected by the mirror as the second scanning pattern, which is different from the first scanning pattern, whereby the second scanning pattern emitted from the second window is composed of the first pattern emitted almost in parallel to the first window and the second pattern emitted to a lower side toward the first window.

Moreover, the present invention includes a light source for generating a light beam, a scanning means for generating a scanning beam by scanning the light beam emitted from the light source, and a window for emitting the scanning pattern made up of the scanning beam scanned by the scanning means, wherein the window emits a first scanning pattern almost in a parallel direction to the apparatus installation surface or counter, and a second scanning pattern emitted at a lower side toward the installation surface.

More particularly, this window is provided with a means for deflecting the scanning pattern, and one of the first and second scanning patterns is emitted after it is deflected by the deflecting means and the other of the first and second scanning patterns is emitted from the position not passing the deflecting means.

Otherwise, this window is provided with a first area through which the first scanning pattern passes, and a second area through which the second pattern passes, and these first and second areas can be visually identified by the operator.

Otherwise, the first area and second area are formed in such a manner as providing different angles.

Moreover, the optical scanning apparatus of the present invention includes a bottom section having a first window which is mounted in a position parallel to an apparatus installation surface, and a side section having the second window which is mounted in a position vertical to the installation surface to scan the bar code attached to the commodity by emitting the scanning patterns from the first and second windows, and includes a light source for emitting a light beam in a vertical direction to the installation surface, a scanning means installed in the manner that the rotating axis thereof becomes parallel to the installation surface for scanning the light beam, a bottom pattern mirror for emitting the scanning pattern to the first window by reflecting the scanning beam generated by the scanning means and a side pattern mirror for emitting the scanning pattern to the second window by reflecting the scanning beam generated by the apparatus, whereby the second window emits the first pattern emitted in the direction parallel to the installation surface and the second pattern emitted at a lower side toward the first window.

Particularly, the second window is divided, for operator identification purposes, into the area through which the first pattern is emitted and the area through which the second pattern is emitted.

BRIEF DESCRIPTION OF THE DRAWINGS

FIG. 8 illustrates scanning when the bar code is horizontal to the bottom window.

FIG. 10 illustrates an emitting path of the side scanning pattern of the first embodiment.

FIG. 12 is a side scanning pattern projected on the bottom window.

FIG. 13 is a cross-sectional view of a side elevation of an optical scanning apparatus of a second embodiment of the present invention.

DESCRIPTION OF THE PREFERRED EMBODIMENTS

A bar code reader (hereinafter referred to as "an apparatus") of the present invention is of a multi-head scanner type that is buried within the checkout counter. Various kinds of multi-head scanners are known and therefore the external appearance and installation in the counter are not described in detail.

Figure 1:
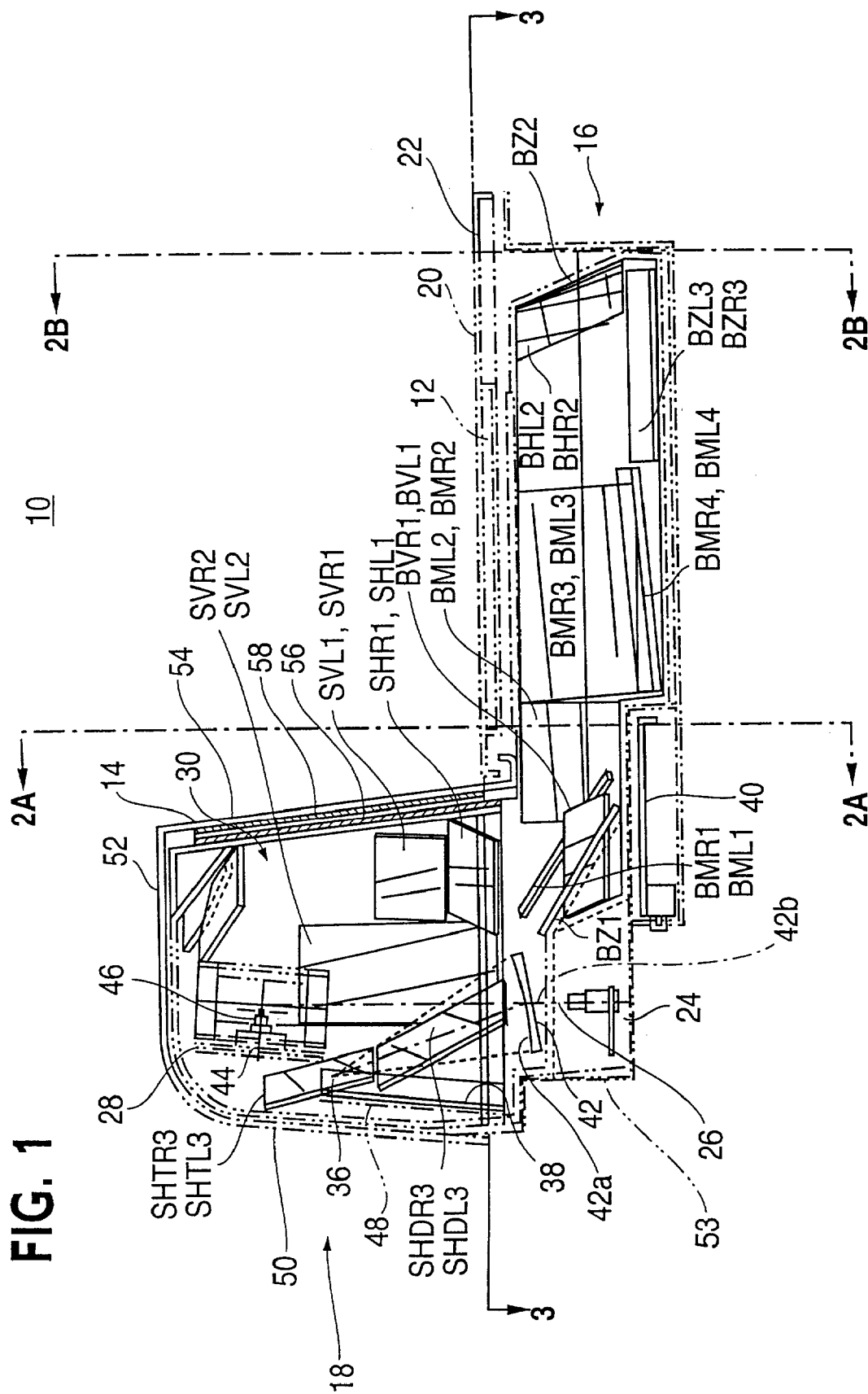
FIG. 1 is a cross-sectional view of a side elevation of an optical scanning apparatus of the first embodiment of the present invention.

As generally seen in FIG. 1, the apparatus 10 is provided with a bottom window 12 at a position parallel to a checkout counter surface 20, and a side window 14 arranged at a position substantially perpendicular to the checkout counter surface 20. These windows 12, 14 each emit scanning patterns composed of a plurality of scanning lines for the purpose of reading a bar code. Moreover, the side window 14 opposes an operator who is reading the bar code. This general structure is similar to that of the multi-head scanner of the prior art.

Figure 2A:
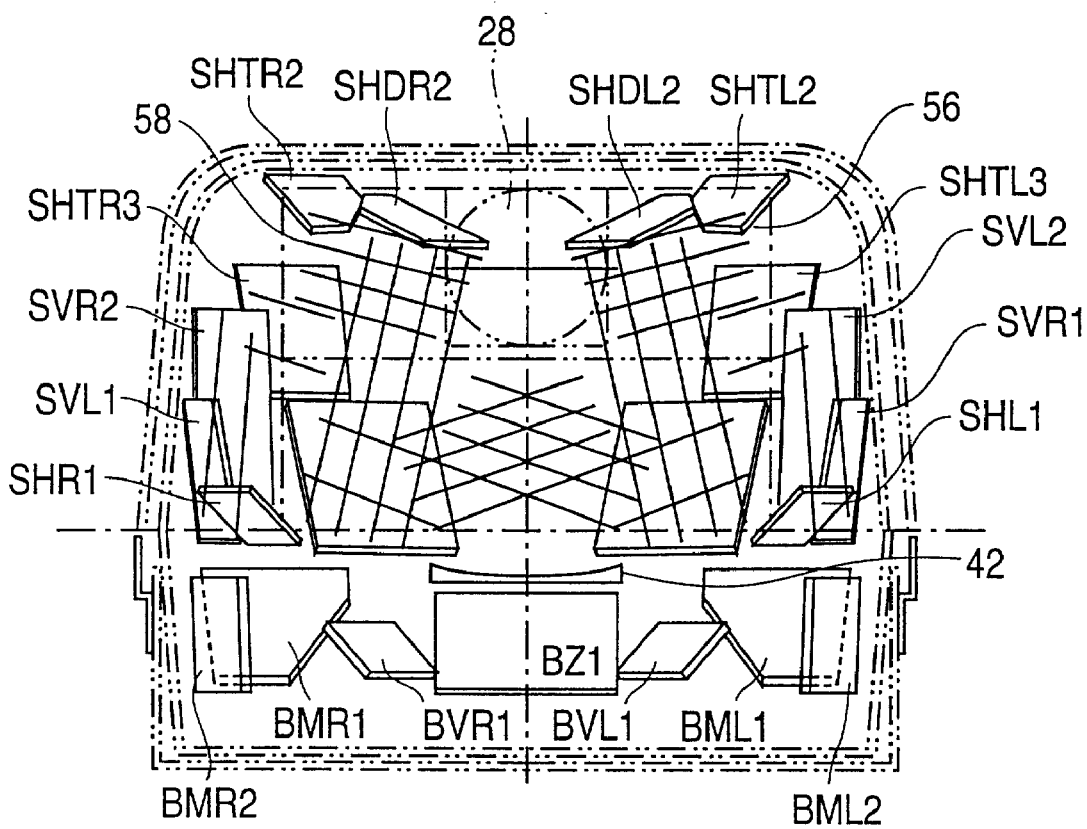
FIGS. 2A and B are cross-sectional views of front elevations of an optical scanning apparatus of the first embodiment of the present invention taken along lines 2A—2A and 2B—2B, respectively, of FIG. 1.
Figure 2B:
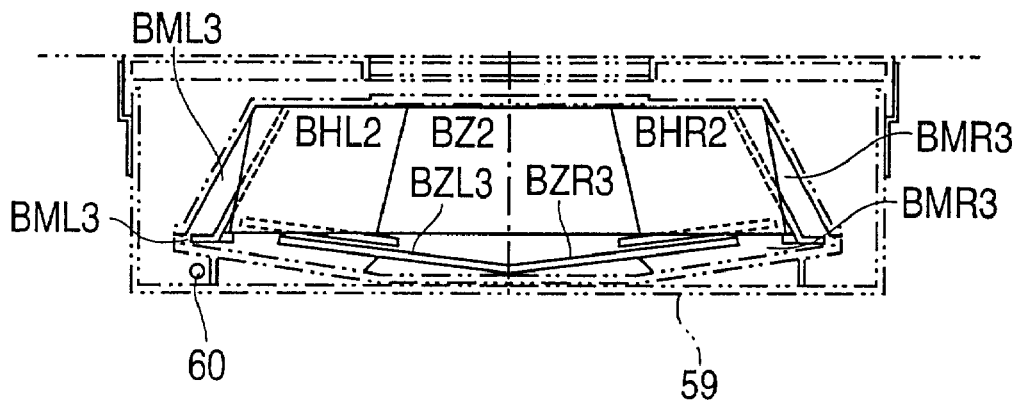
Figure 3:
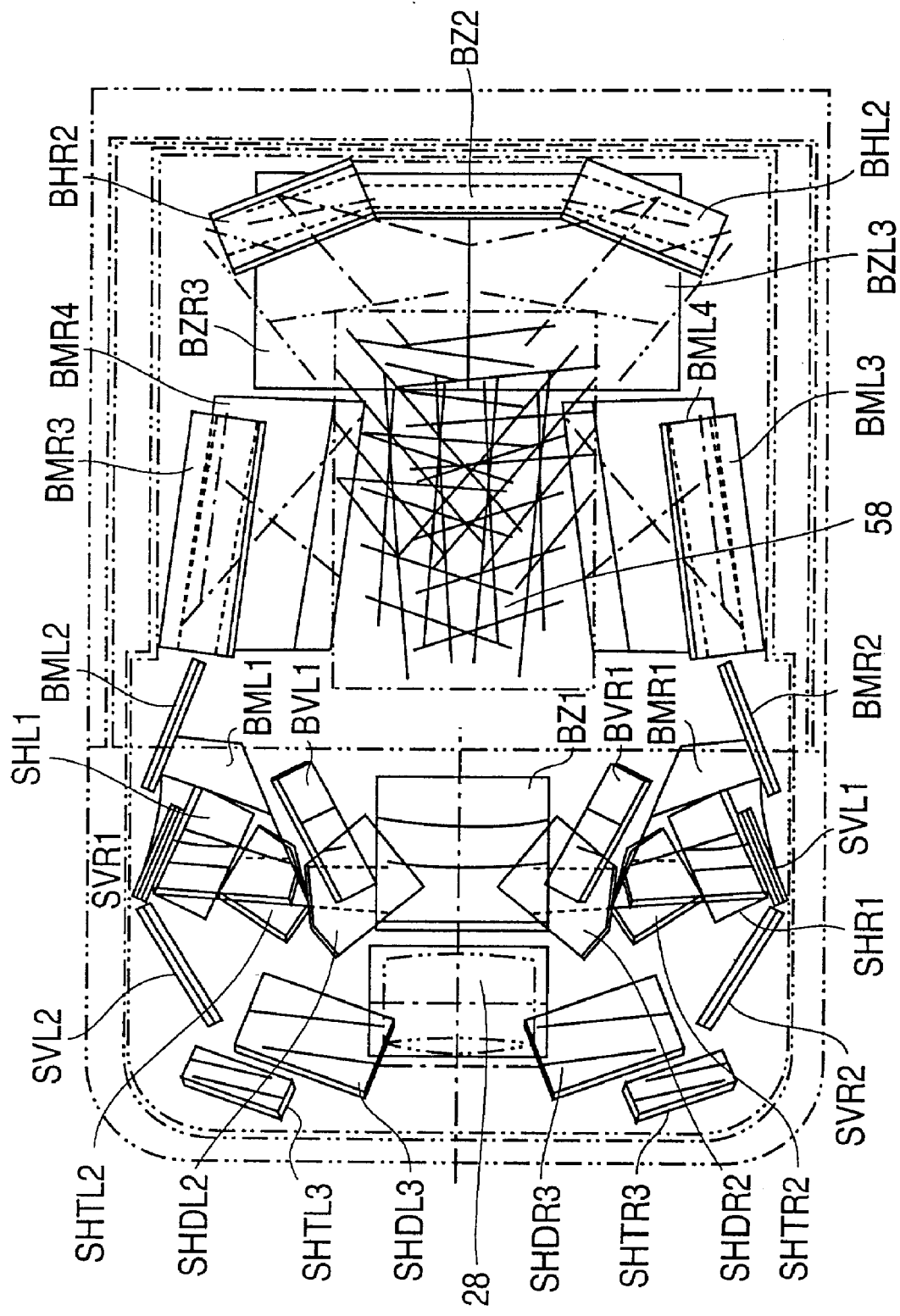
FIG. 3 is a cross-sectional view of an optical scanning apparatus of the first embodiment of the present invention taken along line 3—3 of FIG. 1.

FIGS. 1–3 are views of the interior of the apparatus 10 according to a preferred embodiment. FIG. 1 is the cross-sectional view of a side elevation, particularly illustrating the center line of the apparatus 10. FIG. 2A is the cross-sectional view cut at the line 2A—2A of FIG. 1, and FIG. 2B is a cross-sectional view cut at the line 2B—2B of FIG. 1, respectively. Moreover, FIG. 3 a cross-sectional view of the apparatus viewed from the top, along line 3—3 of FIG. 1.

The apparatus illustrated in FIGS. 1 to 3 is roughly composed, when it is installed at the counter, of a bottom section 16 received at the counter surface 20, and a side section 18 vertical to the counter surface 20. In the example of FIG. 1, the bottom section 16 is relatively longer than the height of the side section 18.

In this installation, a top surface 22 of the bottom section 16 (which is the same as the bottom window 12) is set to the same level as the counter surface 20, because the bar code is read by sliding a commodity on the counter surface 20, known as the "commodity sliding surface" 22. When there is a level difference between the counter surface 20 and top surface 22, the commodity gets caught (and may be broken), deteriorating the reading operation efficiency.

The apparatus 10 is provided with a light source 24 for emitting a laser light beam 26, a polygon mirror 28, as an example of the scanning means, for scanning the laser beam 26 emitted from the light source 24, a pattern mirror (preferably a plurality of mirrors, e.g., SHDR3) 30 for generating a scanning beam forming a scanning pattern (see, e.g., FIG. 4) by adequately reflecting the light beam 26 scanned by the polygon mirror 28, a photo-detector 36 for receiving a light beam reflected from the bar code and outputting an electrical signal depending on the amount of the light beam, an analog-digital converting circuit 38 (hereinafter referred to as A/D circuit, shown as a circuit board in the figure) for converting the analog signal output from the photo-detector 36 to a digital signal through binary conversion, and a main printed circuit board 40 (main PCB) including a decoder, or the like, to demodulate the bar code on the basis of the digital signal output from the A/D circuit 38. The reflected light beam incident to the photo-detector 36 is condensed and reflected by a concave mirror 42.

As the light source 24, a laser diode is used in this embodiment. Moreover, the light source 24 is structured as a laser light source unit integrating a collimator lens and aperture as the laser beam shaping means to shape the laser beam 26 emitted from the laser diode and a driver circuit for driving the laser light source 24. This unit simplifies replacement of the laser light source 24.

The light source 24 is located at the lower left in FIG. 1, namely at the lower part of the cabinet 52 of the side section 18, and the laser beam 26 is emitted from the lower part to the upper part of the apparatus 10. In the example of FIG. 1, the laser beam 26 is emitted upward almost in the vertical direction. It is natural that the laser beam emitting direction (emitting angle) may be tilted depending on the situation, such as design of the apparatus.

In the multi-head scanner of the prior art, when mounted in the counter in the same manner as the embodiment shown, the light beam is emitted upwardly without division.

The laser beam 26 emitted from the light source 24 is incident to the polygon mirror 28, which is arranged at an area near an upper center part of a cabinet 52 of the side section 18. Moreover, although not particularly illustrated, the polygon mirror 28 of the present embodiment is provided with four reflecting surfaces. Tilting angles of each of the four reflecting surfaces are different from each other. Since the tilting angle of each reflecting surface is different, the polygon mirror 28 can generate four parallel scanning beams. The polygon mirror 28 scans the incident laser beam 26 when the mirror is rotated by a motor 44.

A rotating shaft 46 of the polygon mirror 28 is set at a position almost parallel to the bottom window 12 (which is substantially level with the commodity sliding surface 22). In regard to the particular embodiment shown, the rotating shaft 46 is set downward by about 5 degrees. This tilting of the polygon mirror 28 may be changed depending on the design of the optics.

As explained above, the polygon mirror 28 of the present embodiment is structured to allow input of the laser beam 26 from a lower side of the apparatus 10, and to reflect and emit a scanning beam to the lower side. Therefore, the reflecting surface of the polygon mirror 28 can be said to be directed to the lower side (in some cases, the reflecting surface is directed upward, but such reflecting surface does not operate effectively because the laser beam is not incident thereto. When only the reflecting surface operating effectively is considered, the reflecting surface may be thought to be directed downward). When comparing the multi-head scanners of the prior art (wherein the arrangement of the scanner is similar to that of the present embodiment), the following differences may be detected.

In the multi-head scanner of the prior art, the rotating shaft of the polygon mirror has been set almost in the vertical direction to the bottom window. Moreover, the polygon mirror of the prior art has usually been placed in the cabinet of the bottom section 16 or at a lower part of the cabinet 52 of the side section 18. Therefore, a degree of freedom for arrangement of the optical parts, or the like, in the bottom section 16 has been less with the prior art. In addition, in the multi-head scanner of the prior art, it has been difficult to increase the size of the pattern mirror, particularly in the bottom section 16 for the convenience of arranging the position of the polygon mirror and light source 24, or for the convenience of the path of the light beam 26.

On the other hand, with the present invention's structure (light source/scanning means arrangement), the light source and scanning means are not provided within the cabinet 52 of the bottom section. Therefore, a degree of freedom of arrangement of the other optical members (most particularly, the pattern mirror) in the cabinet 53 of the bottom section 16 can be increased.

In order to increase performance in reading the bar code, the amount of light reflected from the bar code must be increased as much as possible. Since the pattern mirror 30 allows the reflected beam from the bar code to enter the photo-detector 36, it is desirable to make the pattern mirror 30 as large as possible. The apparatus of the present embodiment responds to such requirement.

As illustrated in FIG. 1, the photo-detector 36 is integrally mounted on a substrate 48 mounting the A/D circuit 38. This substrate 48 is mounted at a position almost parallel to a wall surface 50 of the cabinet 52 of the side section 18. Moreover, the light receiving surface of the photo-detector 36 is directed downward. The light beam condensed by the concave mirror 42 is incident to the light receiving surface of the photo-detector 36.

The concave mirror 42 operates as a signal beam condensing means and is arranged in the optical path extending to the polygon mirror 28 from the light source 24. A reflecting surface 42a of the concave mirror 42 faces the photo-detector 36 and condenses and reflects, to the photo-detector 36, the reflected beam (signal beam) from the bar code which is incident via the polygon mirror 28. At the center of the concave mirror 42, a hole 42b is provided to input, to the polygon mirror 28, the laser beam 26 emitted from the light source 24.

The main PCB 40 is arranged at the bottom part of the lower part of the cabinet 52 of the side section 18. The main PCB 40 accommodates the decoding means explained above, interface connector for transferring the decoded signal to the external device such as a POS terminal, and a voltage converting means for converting the power supply voltage fed from the external circuit via an AC adapter, etc. to the voltage suitable for the apparatus 10. Moreover, the lighting of the light source 24, the driving of the polygon mirror 28/motor 44 and operation of the A/D circuit 38 are controlled by the main PCB 40.

The laser beam 26 emitted from the light source 24 is shaped to have the resolution required for reading of the bar code by the collimator lens and aperture and is then emitted toward the polygon mirror 28. This light beam 26 enters the polygon mirror 28 through the hole 42b provided at the center of the concave mirror 42.

Particularly as illustrated in FIG. 1, the side window 14 is structured by two sheets of glass. At an external side of the side window 14, an external sheet glass 54 is fitted and, at an internal side of the side window 14, an internal glass sheet 56 and hologram 58 are fitted. The hologram 58 is formed above the internal glass 56. These glass sheets 54, 56 are preferably formed of hard glass (for example, sapphire glass) to prevent damage when a commodity hits the glass. Since the possibility of damage to the internal glass 56 is lower, the internal glass 56 may be formed of ordinary glass or may be a transparent resin plate, or the like.

The hologram 58 is formed only at a particular area on a single glass sheet 56 using various known techniques. For example, duplication is possible by using a known stamper (die) on which the particular pattern groove is formed, or some other well-known technique. In FIG. 2(A), the hologram 58 and internal glass 56 are illustrated by the chain lines.

The scanning beam generated by the polygon mirror 28 is adequately divided and reflected by the pattern mirror 30 (scanning beam dividing means) provided at the bottom section 16 and side section 18, and are then emitted as a scanning pattern 34 from the bottom window 12 and side window 14. The scanning pattern 34 is formed of the scanning beams scanned in a plurality of different directions. Respective scanning directions and angles of the scanning beams are determined by, e.g., tilting of the pattern mirror(s) 30.

Figure 4:
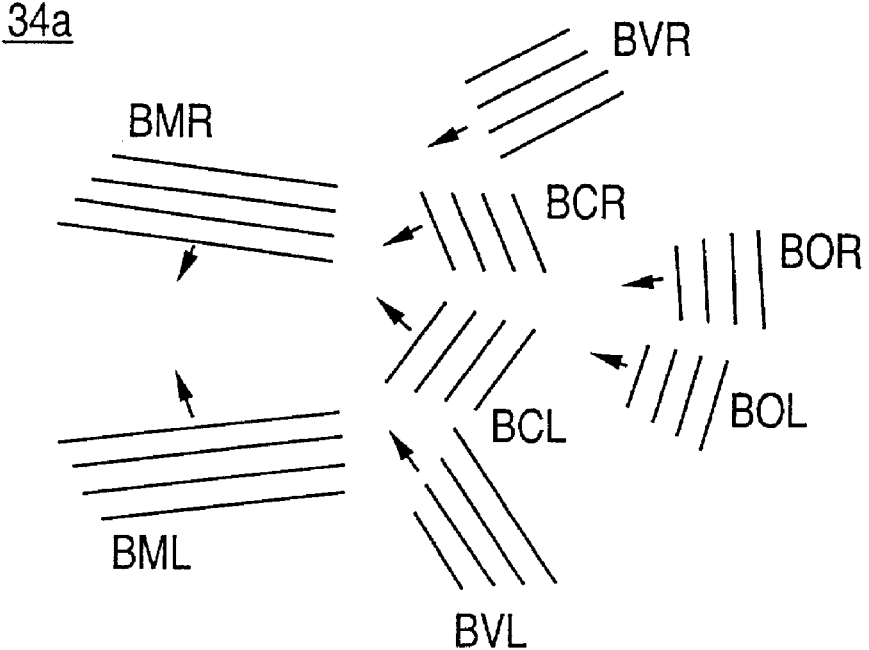
FIG. 4 is a schematic view of a bottom scanning pattern.
Figure 5:
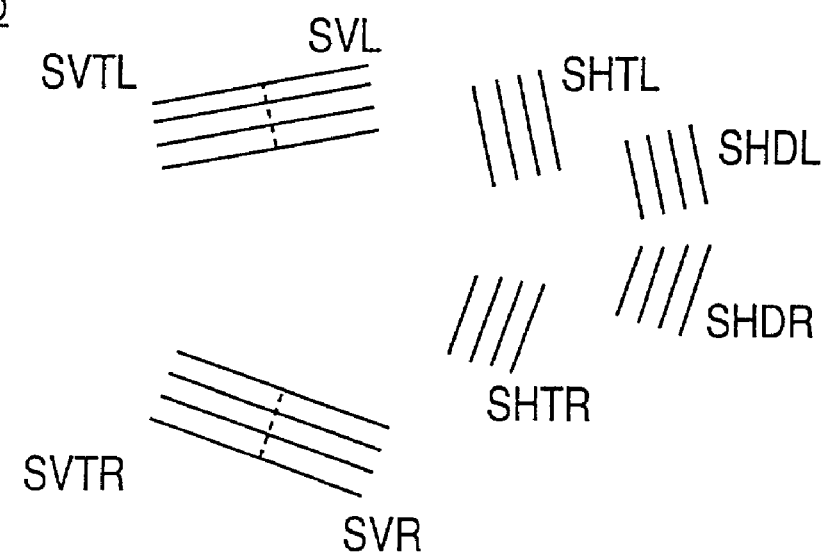
FIG. 5 is a schematic view of a side scanning pattern.

FIG. 4 and FIG. 5, respectively, illustrate the scanning pattern 34a (bottom scanning pattern, called the "bottom pattern") emitted from the bottom window 12 and the scanning pattern 34b (side scanning pattern, called the "side pattern") emitted from the side window 14. FIG. 4 is the plan view of the bottom pattern 34a with the right side corresponding to the end part of the apparatus 10 (right side of figure) in FIG. 1, while the left side corresponds to the side window 14 side. Moreover, FIG. 5 is a plan view of the side pattern 34b viewed from the front side of the apparatus 10 with the right side corresponding to the lower end of side window 14 and the left side corresponding to the upper end of the side window 14.

The bottom pattern 34a is formed of eight patterns of BMR, BML, BVR, BVL, BCR, BCL, BOR, BOL. The character "B" indicates bottom, while "R" and "L" indicate right and left, respectively.

The bottom pattern 34a is almost symmetrical relative to the center line of the apparatus 10, although it would not be perfectly symmetric because of an arrangement of the pattern mirror(s) 30 in the apparatus 10. Particularly, as will be understood from comparison between BOR and BOL, the scanning patterns forming a pair in the right and left sides is not symmetrical strictly in the right and left sides. Particularly, in the case of BOR and BOL, bar code reading (scanning) probability is raised by intentionally deviating the scanning positions.

Each pattern forming the bottom pattern 34a is formed of four scanning lines, because tilting angles of the four surfaces of the polygon mirror 28 are respectively different as explained above. The number of scanning lines forming the pattern can be changed as desired by changing the number of reflecting surfaces and angle of reflecting surfaces of the polygon mirror 28.

The arrows in FIG. 4 indicate the direction of emission from the bottom window 12 of respective patterns forming the bottom pattern 34a (expressed as a plan view). As will be understood from these arrows, each pattern is emitted in the direction of the side window 14. Moreover, each pattern is also emitted to the inside.

In the same manner, the side pattern 34b is formed of six patterns of SVR, SVL, SHTR, SHTL, SHDR, SHDL. The character "S" indicates side. Like the bottom scanning pattern 34a, respective patterns are formed of four scanning lines.

Next, emitting paths of the scanning lines forming the bottom pattern 34a and side pattern 34b will be explained.

The laser beam 26 is emitted toward the polygon mirror 28 from the light source 24, and each scanning line path is common up to this process. The scanning beam generated by the polygon mirror 28 is subsequently scanning the pattern mirror(s) 30 which is illustrated in FIG. 1 to FIG. 3, and includes the following mirrors:

SVL1-SHR1-BMR1-BVR1-BZ1-BVL1-BML1-SHL1-SVR1

Here, among the sign given to the pattern mirror 28, the character indicates correspondence to bottom pattern 34a/side pattern 34b. The pattern mirror 28 indicated by the character B corresponds to the bottom pattern 34a, while the pattern mirror 28 given S corresponds to the side pattern 34b, respectively.

These pattern mirrors 30 allow the reflection surface to be directed to the polygon mirror 28 side and are arranged in the shape of a sector. The pattern mirrors 30 for the bottom pattern 34a are arranged in the direction of the bottom section 16 and the pattern mirrors 30 for the side pattern 34b in the direction of the side section 18, respectively, in order to reflect the scanning beam incident from the polygon mirror 28.

The pattern mirrors 30 used to generate the bottom pattern 34a are arranged at the bottom section 16 and are formed of the following mirrors.

BZ1, BVR1, BVL1, BMR1, BML1, BMR2, BML2, BMR3, BML3, BMR4, BML4, BHR2, BHL2, BZ2, BZR3, BZL3

These mirrors are arranged almost symmetrically to the center line of the apparatus 10. Of these mirrors, the five mirrors BZ1, BVR1, BVL1, BMR1 and BML1, are arranged at the lower surface of the side section 18 and the reflecting surfaces are directed to the bottom section 16. The four mirrors BZR3, BZL3, BMR4, and BML4 are arranged at the bottom surface of the bottom section 16. Moreover, the seven mirrors BMR2, BML2, BMR3, BML3, BHR2, BHL2, and BZ2 are arranged on a side wall surface of the bottom section 16 with the reflecting surfaces tilted a little toward the lower side.

As illustrated in FIG. 2(B), the BZR3 and BZL3 mirrors are tilted with their external sides directed a little to the upper side. With such a structure, a space can be reserved between a bottom surface 59 of the bottom section 16 and a pattern mirror 30 (for example, BZL3). In this space, a cable 60, for example, can be laid. Such tilting may also be provided to BMR4, BML4.

The scanning line forming the bottom pattern 34a is emitted from the bottom window 12 passing the following route after it is reflected by the polygon mirror 28.

BMR: Polygon-BMR1-BMR2-BMR3-BMR4-bottom window
BML: Polygon-BML1-BML2-BML3-BML4-bottom window
BCR: Polygon-BZ1-BZ2-BZR3-bottom window
BCL: Polygon-BZ1-BZ2-BZL3-bottom window
BOR: Polygon-BZ1-BHR2-BZR3-bottom window
BOL: Polygon-BZ1-BHL2-BZL3-bottom window
BVR: Polygon-BVR1-BHR2-BZR3-bottom window
BVL: Polygon-BVL1-BHL2-BZL3-bottom window As will be apparent from the above, BCR (BCL) and BOR (BOL) use in common two mirrors BZ1 and BZR3 (BZL3), and the path is different only for the part of BZ2 and BHR2 (BHL2). In the same manner, BOR (BOL) and BVR (BVL) use in common two pattern mirrors BHR2 (BHL2) and BZR3 (BZL3), and the pattern mirrors BZ1 and BVR2 (BVL2) to which the scanning beam scanned by the polygon mirror 28 is incident are different.

As explained above, two pattern mirrors are used in common by different scanning lines. Due to the employment of this structure, the number of pattern mirrors 30 which must be accommodated in the bottom section can be reduced. When the total number of mirrors may be reduced, an area of a mirror can be increased, in the case where the mirrors are accommodated in the same space and thereby condensing efficiency of the light beam reflected from the bar code can be improved.

Particularly, the pattern of BOR (BOL) and BVR (BVL) draw the loci which are almost crossing orthogonally but the apparatus 10 which reflects the scanning beams of different scanning loci with the common pattern mirror is not known in the art.

The pattern mirrors to generate the side pattern 34b include the following:

SVR1, SVL1, SVR2, SVL2, SHR1, SHL1, SHTR2, SHTL2, SHTR3, SHTL3, SHDR2, SHDL2, SHDR3, SHDL3

These pattern mirrors are also arranged almost symmetrical for the center line of the apparatus 10 as in the case of the bottom pattern mirrors, described above. Moreover, four pattern mirrors SHTR2, SHTL2, SHDR2, SHDL2 are arranged on the upper part of the cabinet 52 of the side section 18 with the reflecting surface directed to the lower side.

The scanning patterns forming the side pattern mirrors 30 are once scanned by the polygon mirror 28 and are then emitted from the side window 14 with the following path.

SVR: Polygon-SVR1-SVR2-side window
SVL: Polygon-SVL1-SVL2-side window
SHTR: Polygon-SHR1-SHTR2-SHTR3-side window
SHTL: Polygon-SHL1-SHTL2-SHTL3-side window
SHDR: Polygon-SHR1-SHDR2-SHDR3-side window
SHDL: Polygon-SHL1-SHDL2-SHDL3-side window As is apparent from above, SHTR (SHTL) and SHDR (SHDL) use SHR (SHL) as the common mirror.

Figure 6:
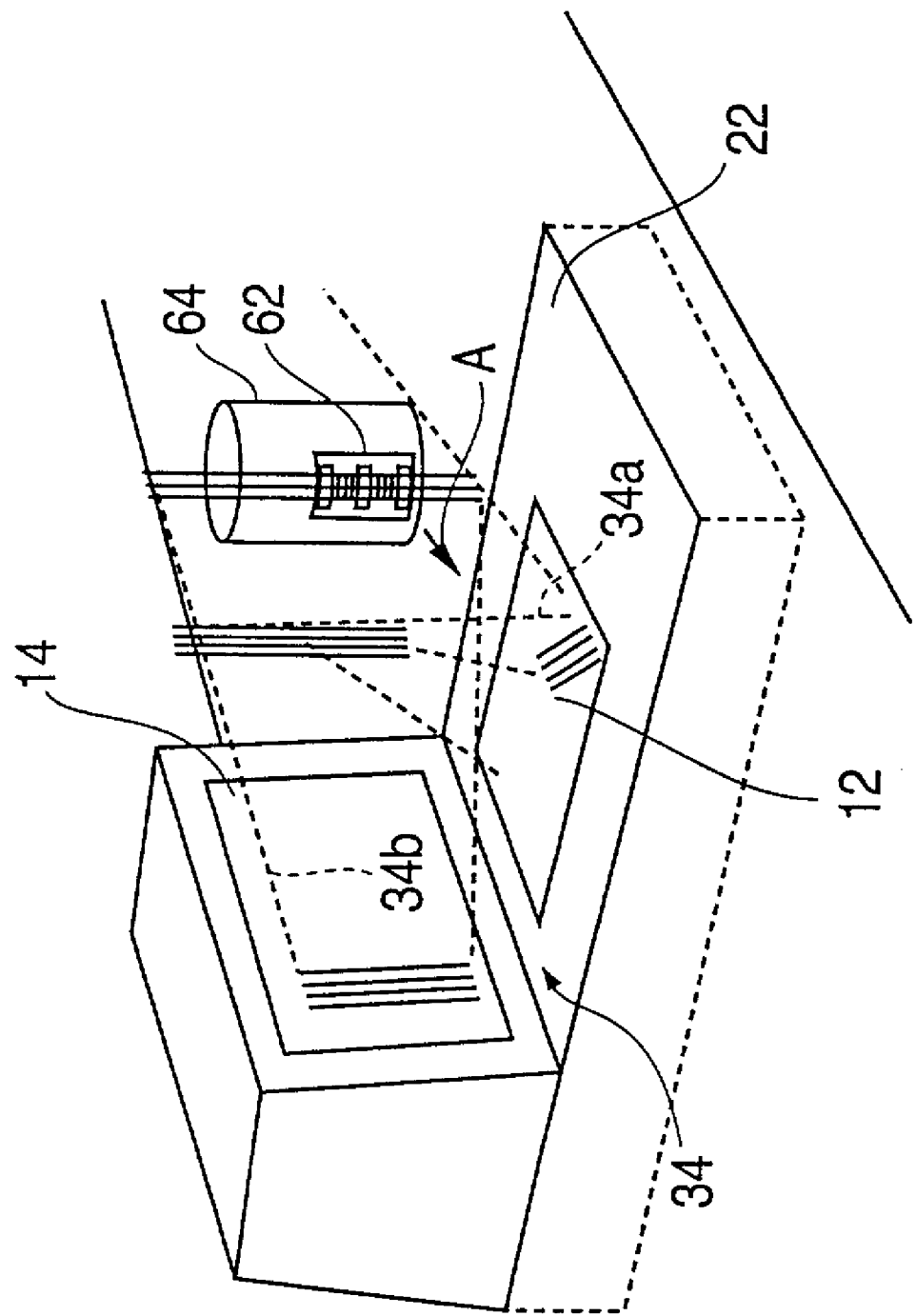
FIG. 6 illustrates scanning when the bar code is vertical to the bottom window.

FIG. 6 illustrates scanning locus by the scanning pattern 34 when a bar code 62 on a commodity 64 is arranged in the vertical direction relative to the bottom window 12. In this case, it is desirable that the bar code 62 is scanned by the scanning pattern 34 (scanning pattern almost matched with the bar code 62 moving direction) emitted toward the bar code 62 and scanned in the vertical direction to the bottom window 12. More specifically, both patterns of SVR, SVL are emitted from the side window 14, and both patterns of BVR, BVL are emitted from the bottom window 12.

As illustrated in FIG. 6, it is assumed that commodity 64 having the bar code 62 thereon moves in a direction A, i.e., to the left side of the apparatus 10. In this case, four scenarios are envisioned.

Case 1: the bar code 62 is almost facing the side window 14.
Case 2: the bar code 62 is facing the direction A.
Case 3: the bar code 62 is facing a direction opposite A.
Case 4: the bar code 62 is facing the operator side (not facing the side window 14).

FIGS. 7A–D illustrate the relationship between the bar code and scanning pattern for scanning the bar code for these four cases.

Figure 7A:
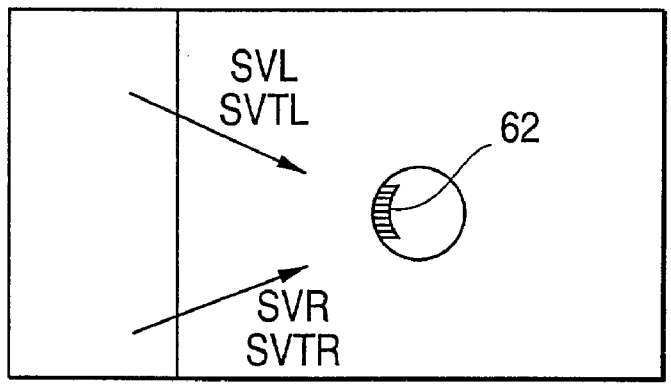
FIGS. 7A–D illustrate positional relationships between the bar code and the scanning patterns.

FIG. 7(A) illustrates the case where the bar code 62 is directed to the side window 14 side. In this case, the bar code is scanned for reading by the SVR pattern and SVL patterns emitted from the side window 14.

Figure 7B:
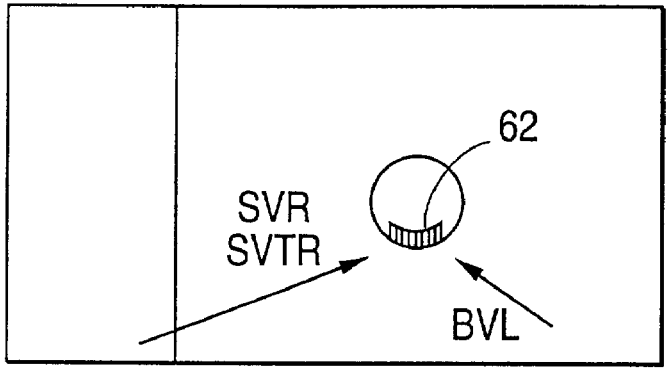

FIG. 7(B) illustrates the case where the bar code 62 is directed to the commodity moving direction A. In this case, the bar code 62 is scanned by the SVR pattern emitted from the side window 14 and the BVL pattern emitted from the bottom window 12.

Figure 7C:
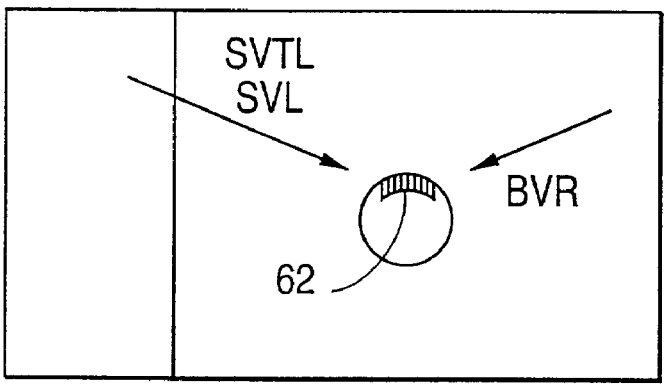

FIG. 7(C) illustrates the case where the bar code 62 is directed to the opposite direction to the commodity moving direction A. In this case, the bar code 62 is scanned by the SVL pattern emitted from the side window 14 and the BVR pattern emitted from the bottom window 12.

Figure 7D:
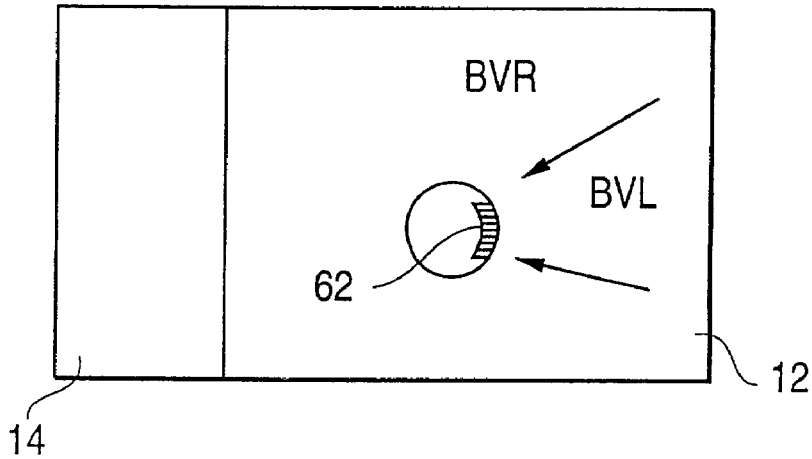

FIG. 7(D) illustrates the case where the bar code 62 is directed to the operator side. In this case, the bar code 62 is never scanned by the scanning beam emitted from the side window 14, but is scanned for reading by the BVR pattern and BVL pattern emitted from the bottom scanner to the side window 14.

As explained above, even when the bar code 62 is located in the vertical direction to the bottom window 12 in the present embodiment, the reading in the range of 360 degrees can be realized regardless of the bar code 62 direction A.

FIG. 8 illustrates the scanning locus of the scanning pattern which is almost horizontal to the bottom window 12. In this case, the bar code 62 is scanned using the scanning pattern scanned in the parallel direction to the bottom window 12. The commodity 64 moving direction A is the same as that in FIG. 6.

As the case of FIG. 6, four cases may be considered.
Case 1: the bar code 62 faces to the side window 14.
Case 2: the bar code 62 faces direction A.
Case 3: the bar code 62 faces the direction opposite direction A.
Case 4: the bar code 62 faces the operator side.

FIG. 9 individually illustrates the four cases explained above.

Figure 9A:
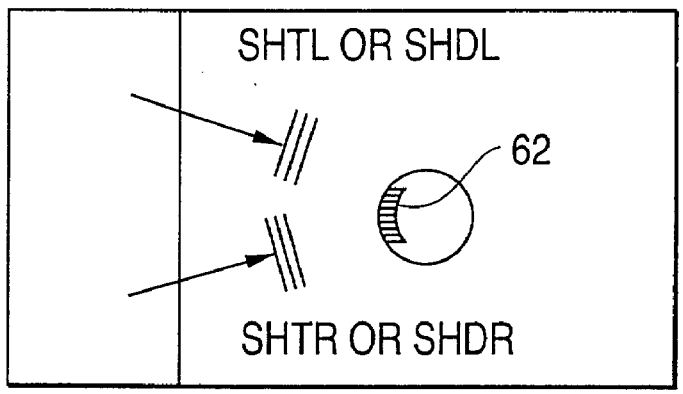
FIGS. 9A–D illustrate positional relationships between the bar code and scanning patterns.

FIG. 9(A) illustrates the case where the bar code 62 is directed to the side window 14. In this case, the bar code 62 is scanned by the SHTR pattern, SHDR pattern, SHTL pattern or SHDL pattern emitted from the side window 14.

Figure 9B:
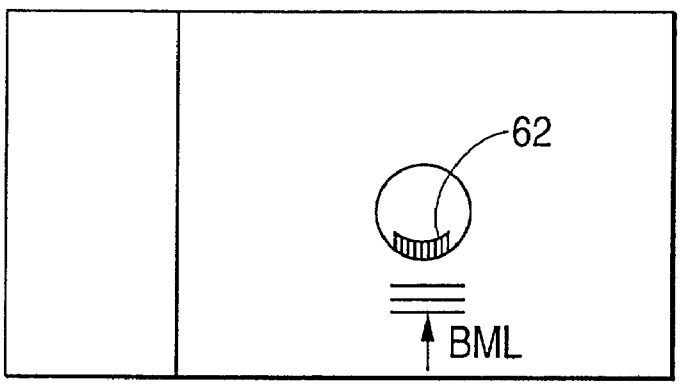

FIG. 9(B) illustrates the case where the bar code 62 is directed to the commodity 64 moving direction A. In this case, the bar code 62 is scanned by the BML pattern emitted to the commodity 64 moving direction A from the bottom window 12.

Figure 9C:
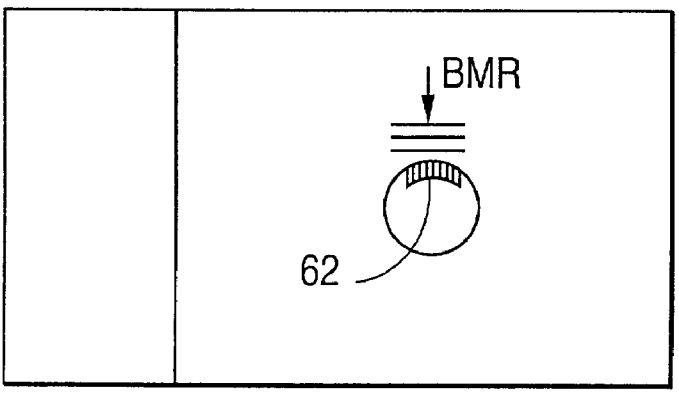

FIG. 9(C) illustrates the case where the bar code 62 faces the direction opposite the commodity moving direction A. In this case, the bar code 62 is scanned by the BMR pattern emitted from the bottom window 12.

Figure 9D:
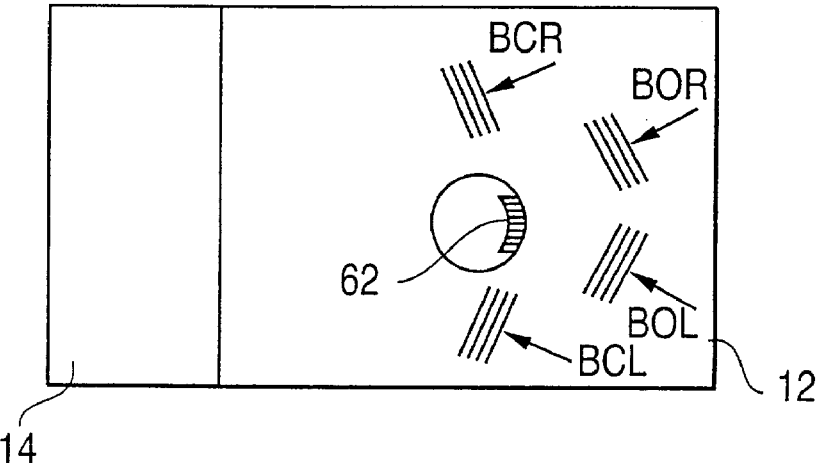

FIG. 9(D) illustrates the case where the bar code 62 is directed to the operator side. In this case, the bar code 62 is never scanned by the scanning pattern emitted from the side window 14 but is scanned by the each pattern of BOR, BCR, BCL, BOL emitted in the direction of the side window 14 from the bottom window 12.

As explained above, even when the bar code 62 is located in the horizontal direction to the bottom window 12, the reading in the range of 360 degrees can be realized by the present embodiment.

Here, the BVR (BVL) pattern drawing the scanning locus in almost vertical to the bottom window 12 and the BOR (BOL) pattern drawing the scanning locus in almost an horizontal direction to the bottom window 12 are emitted from the bottom window 12 almost in the same direction. Namely, these scanning patterns scan the bar code 62 almost in the same condition, although drawing the scanning locus in different directions. Therefore, even when the bar code 62 is located in the vertical direction to the bottom window 12, or in the horizontal direction to the bottom window 12, similar bar code 62 reading can be realized.

FIG. 10 illustrates emission of the SHDL, SHDR, SHTL, SHTR in which the scanning beam is scanned almost in the horizontal direction among the side patterns.

SHDR (SHTL) is once reflected by the pattern mirror SHDR3 (SHDL3) and is then emitted from the side window 14. In this case, SHDR (SHDL) is emitted almost parallel to the bottom window 12 or in a little upward direction. Meanwhile, SHTR (SHTL) is reflected by the pattern mirror SHTR3 (SHTL3) and is then emitted from the side window 14.

Here, the hologram 58 is formed on the path of the pattern SHTR reflected by SHTR3. This hologram 58 is formed to diffract the incident pattern SHTR to the lower side. Therefore, the pattern SHTR diffracted by the hologram is emitted to the lower side, toward the bottom window 12.

The scanning pattern emitted to the lower side, like SHTR, is preferential to reading a bar code affixed on the upper side of a commodity that cannot be tilted, such a tray commodity. On the other hand, the scanning pattern which is emitted in the horizontal direction like SHDR is also acquired. Except for the tray commodity, it is often observed that an operator tries to read the bar code by directing it toward the window surface. Since the scanning pattern emitted in the horizontal direction like the SHDR pattern is acquired, a successful rate of bar code reading by such manipulation will no longer be reduced.

Figure 11:
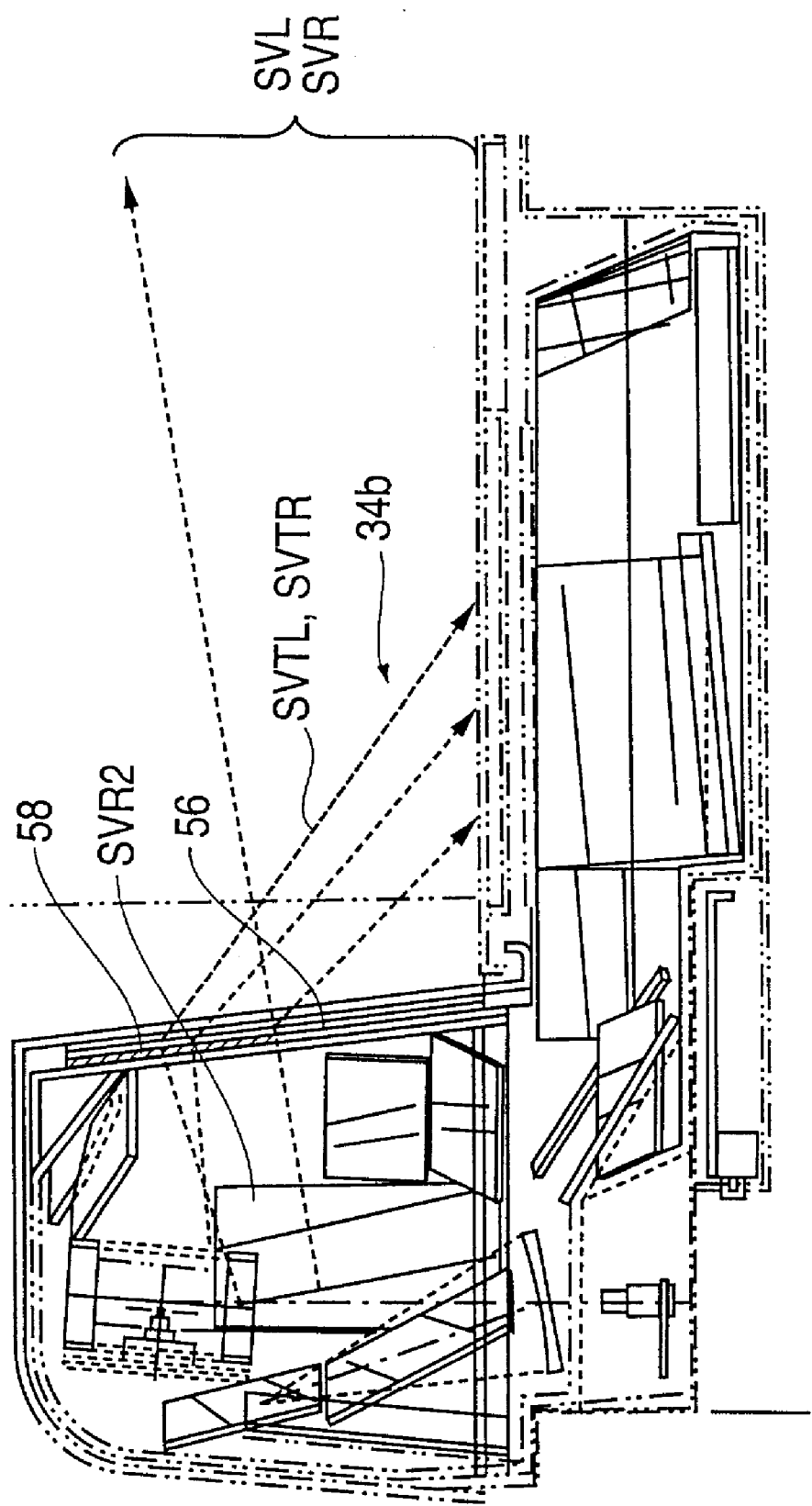
FIG. 11 illustrates an emitting path of the side scanning pattern of the first embodiment.

FIG. 11 illustrates the direction of emission of each pattern of SVTR, SVTL, SVR, SVL in which the scanning beam is scanned almost in the vertical direction to the bottom window 12 among the side pattern 34b.

SVR (SVL) and SVTR (SVTL) are respectively reflected by the pattern mirror SVR2 (SVL2) and then emitted from the side window 14. However, SVR is reflected at the lower side of the pattern mirror SVR2, while SVTR is reflected at the upper side of the pattern mirror.

In the path of SVR reflected by the SVR2, are the internal glass 56 and external glass 54, and SVR is emitted almost in the horizontal direction to the bottom window 12 surface. Meanwhile, in the emitting path of the SVTR reflected by SVR2, the hologram 58 is formed. This hologram 58 is identical to that illustrated in FIG. 10 and it diffracts the incident pattern SVTR to the lower side.

With the function of the hologram 58, the pattern SVTR emitted from the side window 14 is emitted toward the bottom window 12 like SHTR of FIG. 10, and thereby the commodities 64 existing in the reading area can be scanned from the upper side.

FIG. 12 illustrates the projected side pattern 34b at the bottom window 12 surface. The square part illustrates the bottom window 12. Moreover, the condition where the side pattern 34b projected on the bottom window surface is disassembled for each pattern is illustrated to easily understand the upper and lower direction of the bottom window 12.

SHTL pattern and SVTL pattern or SHTR pattern and SVTR pattern draw the loci which are almost orthogonal with each other on the bottom window 12 surface. On the bottom window 12 surface, the four patterns illustrated can be emitted to the lower side from the side window 14.

With the structure explained above, in this embodiment, a scanning pattern can be emitted in the horizontal direction from the side window 12 and a scanning pattern can be emitted in a downward direction.

In the present embodiment, the hologram 58 is formed at the internal glass 56 of the side window 14, but the hologram may 58 also be formed at the position corresponding to the external glass 54. Essentially, it is not required to use two sheets of glass plates for external side and internal side.

Figure 14:
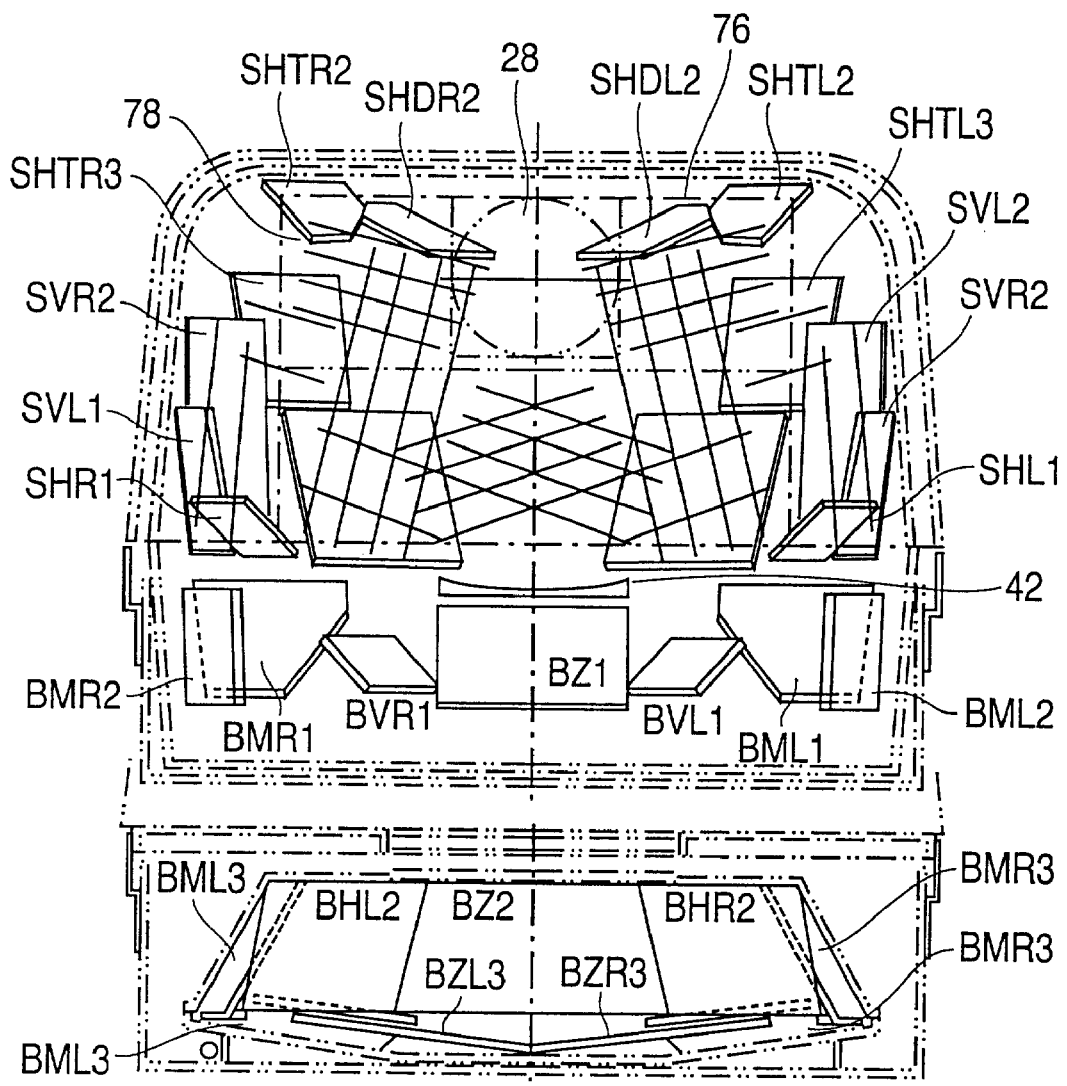
FIG. 14 is a cross-sectional view of a front elevation of the optical scanning apparatus of the second embodiment of the present invention.
Figure 15:
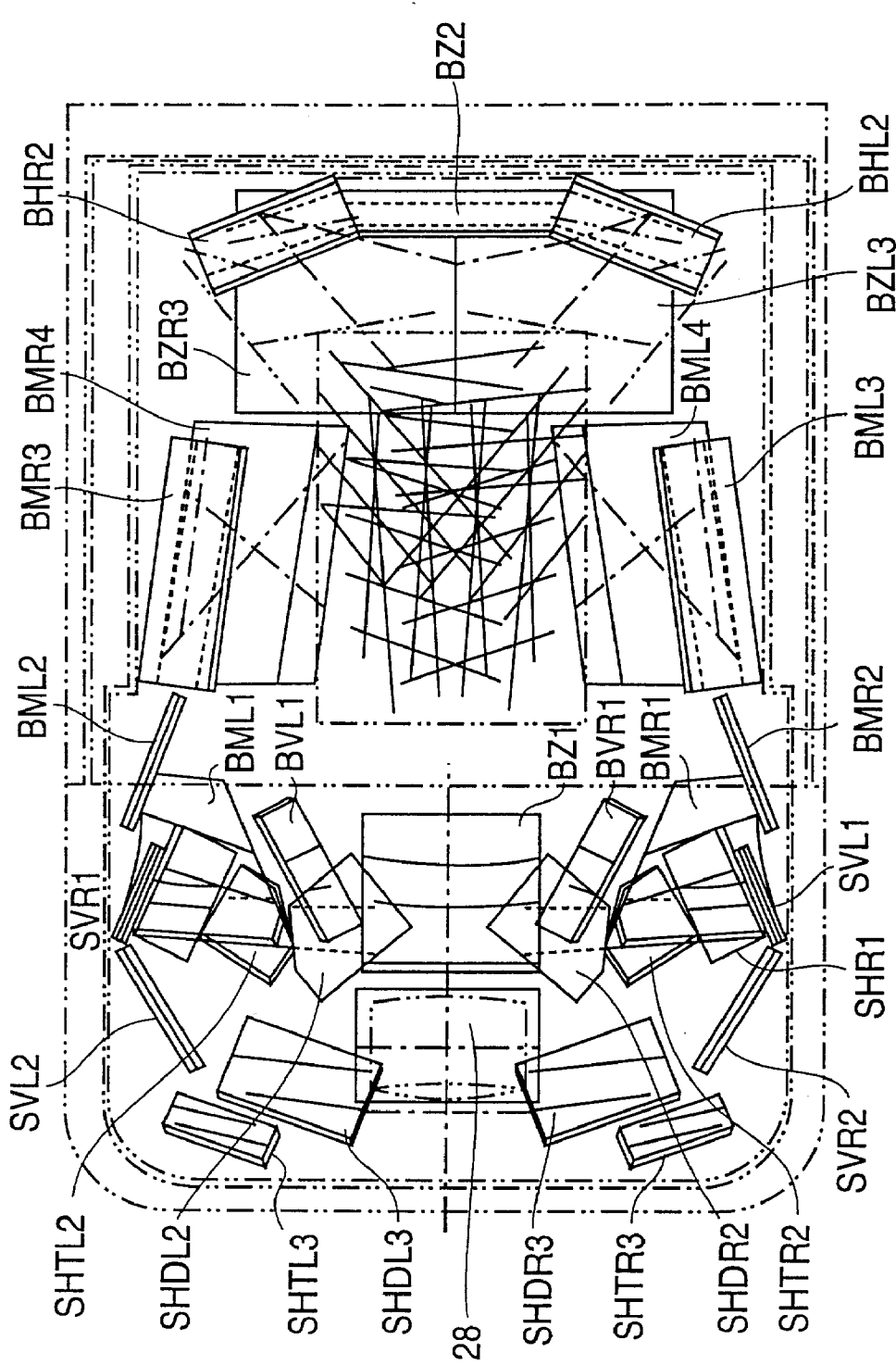
FIG. 15 is cross-sectional view of an optical scanning apparatus of the second embodiment of the present invention.

FIG. 13 to FIG. 15 illustrate the second embodiment of the present invention. This second embodiment has almost the same external appearance as the apparatus illustrated in FIG. 1 to FIG. 3, but a distinctive difference is the shape of cross-section of the side window 70.

As illustrated in FIG. 13, the side window 70 of this second embodiment is curved in a shape of "<". The lower part 70a of the side window 70 is tilted almost at the same angle as the side window 14 of the first embodiment, but the upper part 70b of the side window 70 is tilted toward the lower side, i.e., toward the bottom window 72. Like the side window 14 illustrated in FIG. 1, the side window 70 of the present embodiment is formed of an external glass 74 and an internal glass 76/hologram 78. In regard to the structure other than the side window 70, the internal structure of the apparatus of the present embodiment illustrated from FIG. 13 to FIG. 15 is basically similar to that illustrated in FIG. 1 to FIG. 3.

Figure 16:
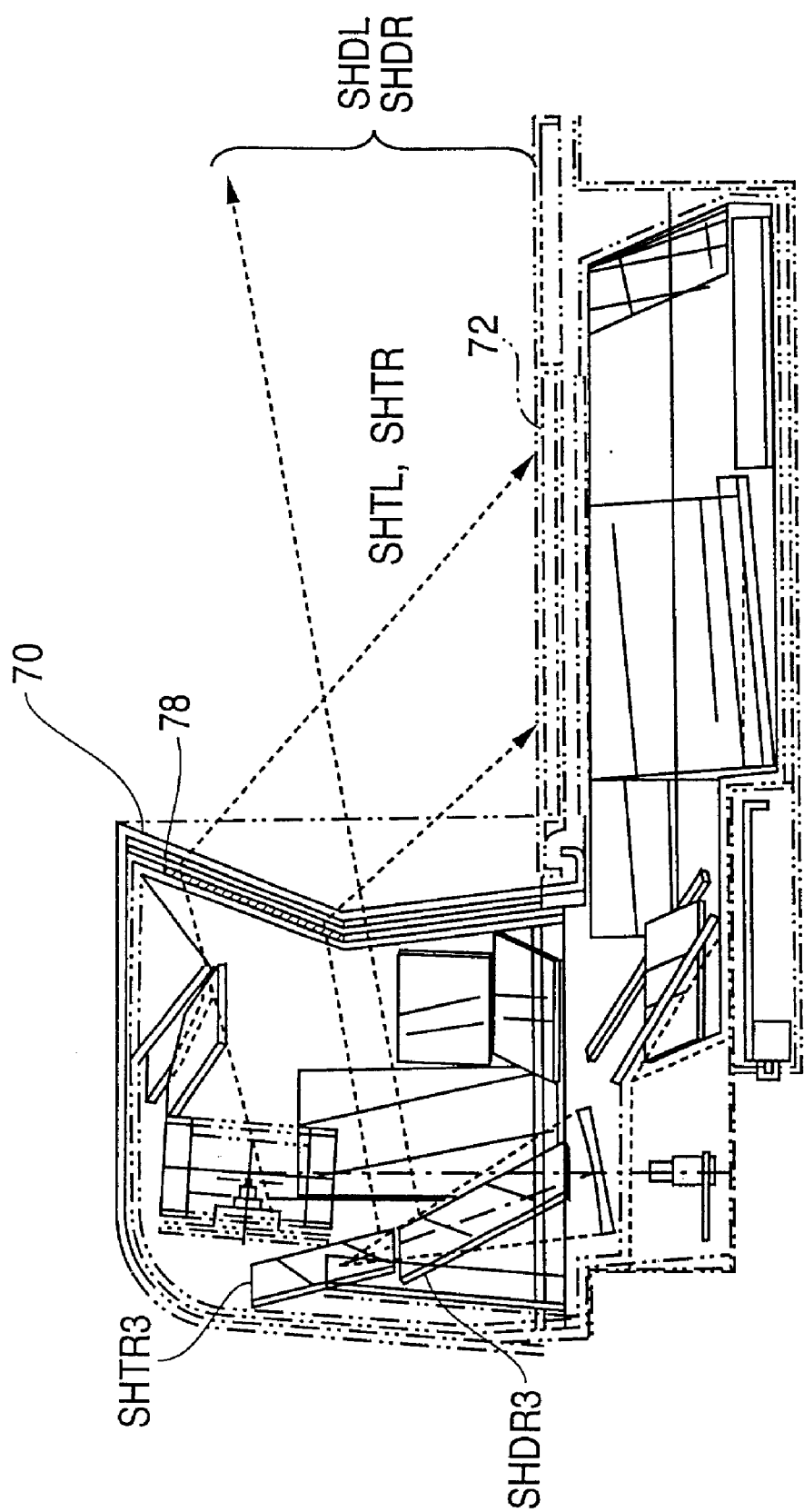
FIG. 16 illustrates an emitting path of the side scanning pattern of the second embodiment.

FIG. 16 illustrates the emitting path of the scanning beams drawing the scanning loci in almost the horizontal direction to the bottom window 72 among the scanning patterns emitted from the side window 70 of the present embodiment and therefore corresponds to FIG. 10. The only difference from FIG. 10 is an incident angle of the pattern SHTR to the hologram. In the embodiment of FIG. 10, the pattern is incident almost perpendicular to the hologram 78 but the scanning pattern is incident to the hologram 78 in a certain angle (for example, 44 degrees).

Figure 17:
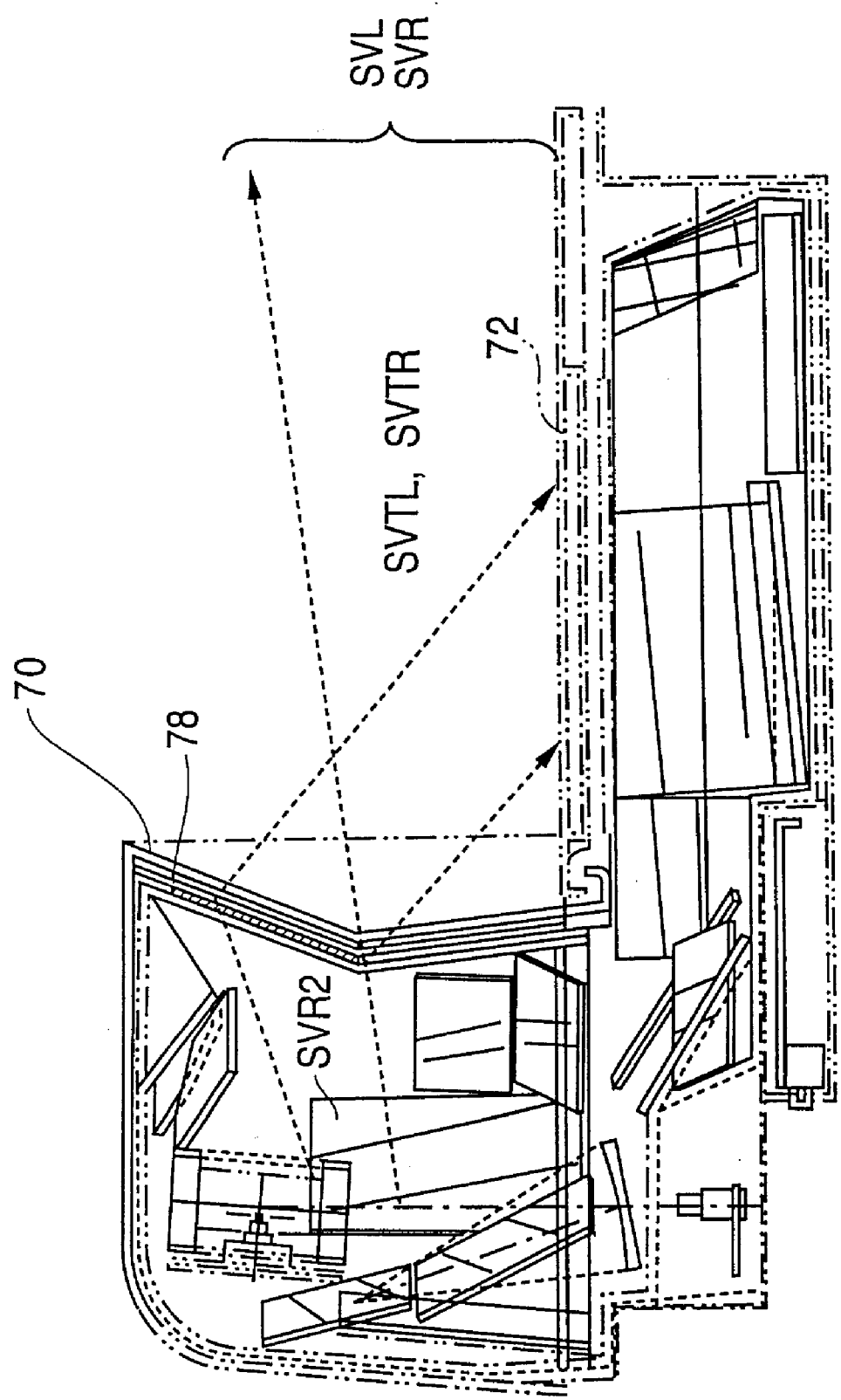
FIG. 17 illustrates an emitting path of the side scanning pattern of the second embodiment.

FIG. 17 illustrates the emitting path of the scanning beams drawing the scanning loci almost perpendicular to the bottom window 72 and corresponds to FIG. 11. The only difference from FIG. 11 is the same as between FIG. 10 and FIG. 16.

Here, since the side window 70 is divided, and a part thereof is diagonally tilted to the lower side to the bottom window 72, the following operation and effect can be expected.

First, if the upper part of the side window 70 is tilted downwardly, an operator would expect the scanning pattern to be emitted from that part to be emitted downward. Therefore, on the occasion of reading the bar code attached on the upper part of the tray commodity, an operator can easily bring the commodity to the area near the upper part of the side window 70. Therefore, the bar code attached on the tray commodity can be read more accurately Meanwhile, in the case of the apparatus 10 illustrated in FIG. 1, it is difficult for an operator to detect from which part the scanning pattern is emitted in the horizontal direction and to detect from which part the scanning pattern directed downward is emitted. As explained above, in the present embodiment, the psychological load of an operator can be reduced.

Figure 18:
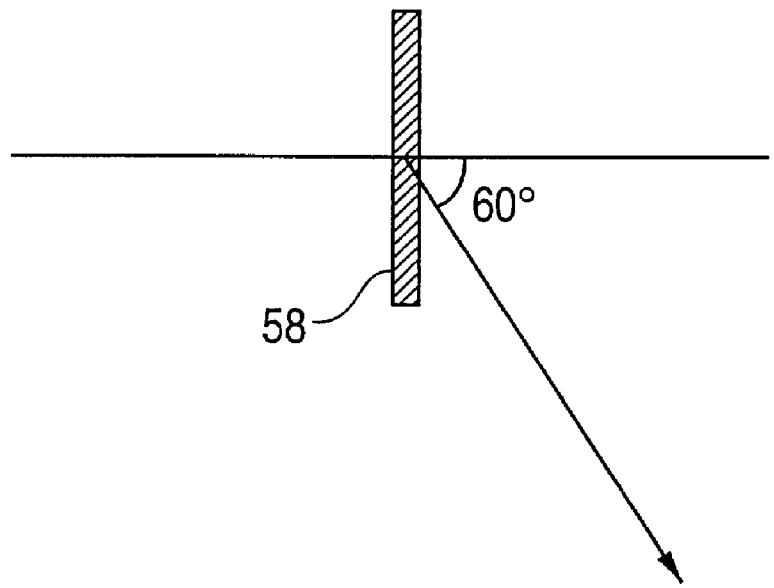
FIG. 18 illustrates hologram characteristics of the first embodiment.

Second, a difference is generated in the incident angles of the hologram to the scanning pattern or emitting angle from the hologram. FIG. 18 illustrates incident angle/emitting angle of the hologram 58 and scanning pattern in the first embodiment. In the example of FIG. 18, the scanning pattern is incident to the hologram almost in the vertical direction (illustrated incident angle: 0 degree). In the example of FIG. 18, the emitting angle of the scanning pattern from the hologram is 60 degrees.

Figure 19:
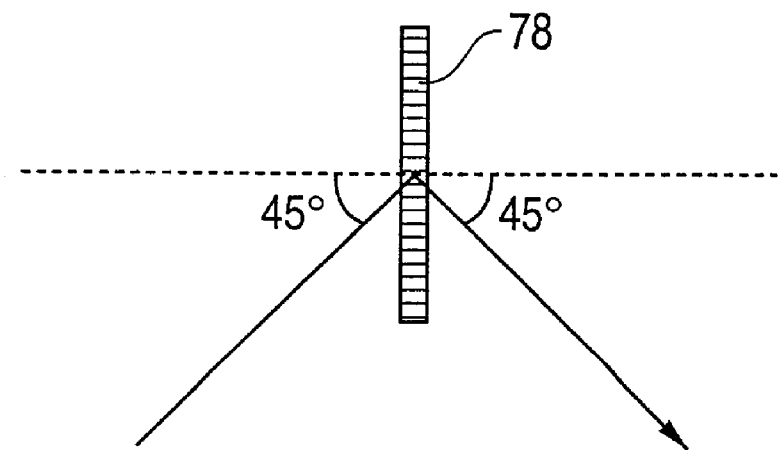
FIG. 19 illustrates hologram characteristics of the second embodiment.

Meanwhile, FIG. 19 illustrates incident angle/emitting angle of the hologram 78 and scanning pattern in the second embodiment. In the example of FIG. 19, incident angle to the hologram of the scanning pattern and the emitting angle from the hologram are set respectively to 45 degrees.

In general, it is desirable to provide a hologram having higher diffraction efficiency so that interference fringes are formed in the angle in the direction of dividing the angle formed by the incident beam and emitting beam to/from the hologram into two sections. Here, since the incident angle to the hologram is largely different from the emitting angle in the example of FIG. 18, the fringes formed on the hologram are formed in the diagonal direction for the surface of the hologram. On the other hand, since the incident angle to the hologram is almost identical to the emitting angle in the example of FIG. 19, the fringes formed on the hologram may be formed almost vertical to the hologram surface.

The hologram can generally be formed by the ordinary method of molding from the master hologram. In the case of forming the hologram by such method, molding becomes difficult if fringe is formed in the diagonal direction as illustrated in FIG. 18, resulting in the problem that hologram manufacturing yield is poor. On the other hand, since the fringe is formed almost vertical in the example of FIG. 19, the molding job becomes easy and hologram manufacturing yield can also be improved.

In the apparatus of the second embodiment, in comparison with the apparatus of the first embodiment, the side pattern would be emitted from the side window 70 at a relatively sharp angle. When considering the incident angle of the scanning pattern to the bar code attached on the upper surface of the tray commodity, the scanning pattern is incident to the bar code in the angle nearer to the vertical direction than that in the second embodiment. Therefore, on the occasion of reading the bar code, for example, of lower print concentration and the bar code having a smaller magnification factor of printing, the reading coefficient is higher in the second embodiment.

Figure 20:
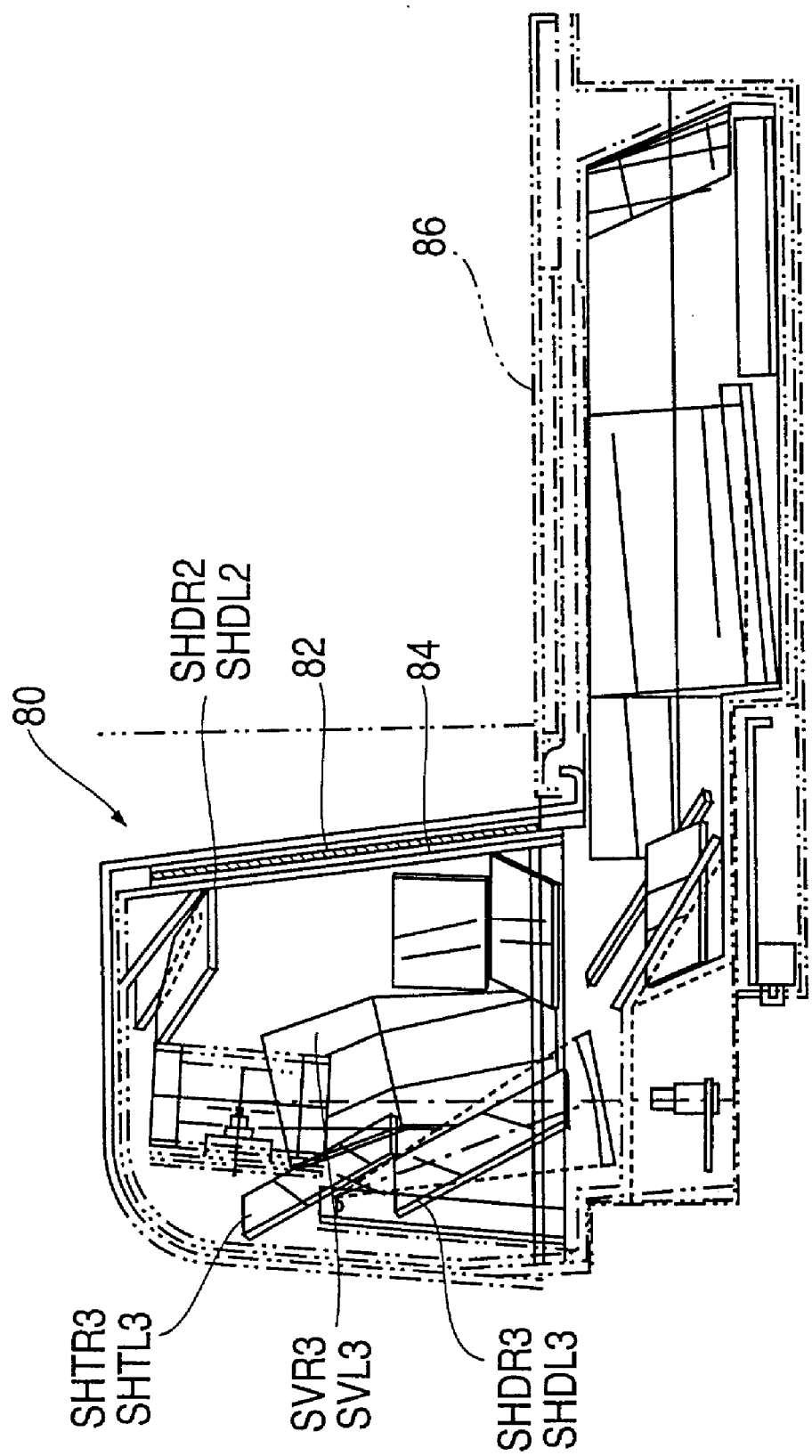
FIG. 20 is a cross-sectional view of a side elevation of an optical scanning apparatus of a third embodiment of the present invention.
Figure 21:
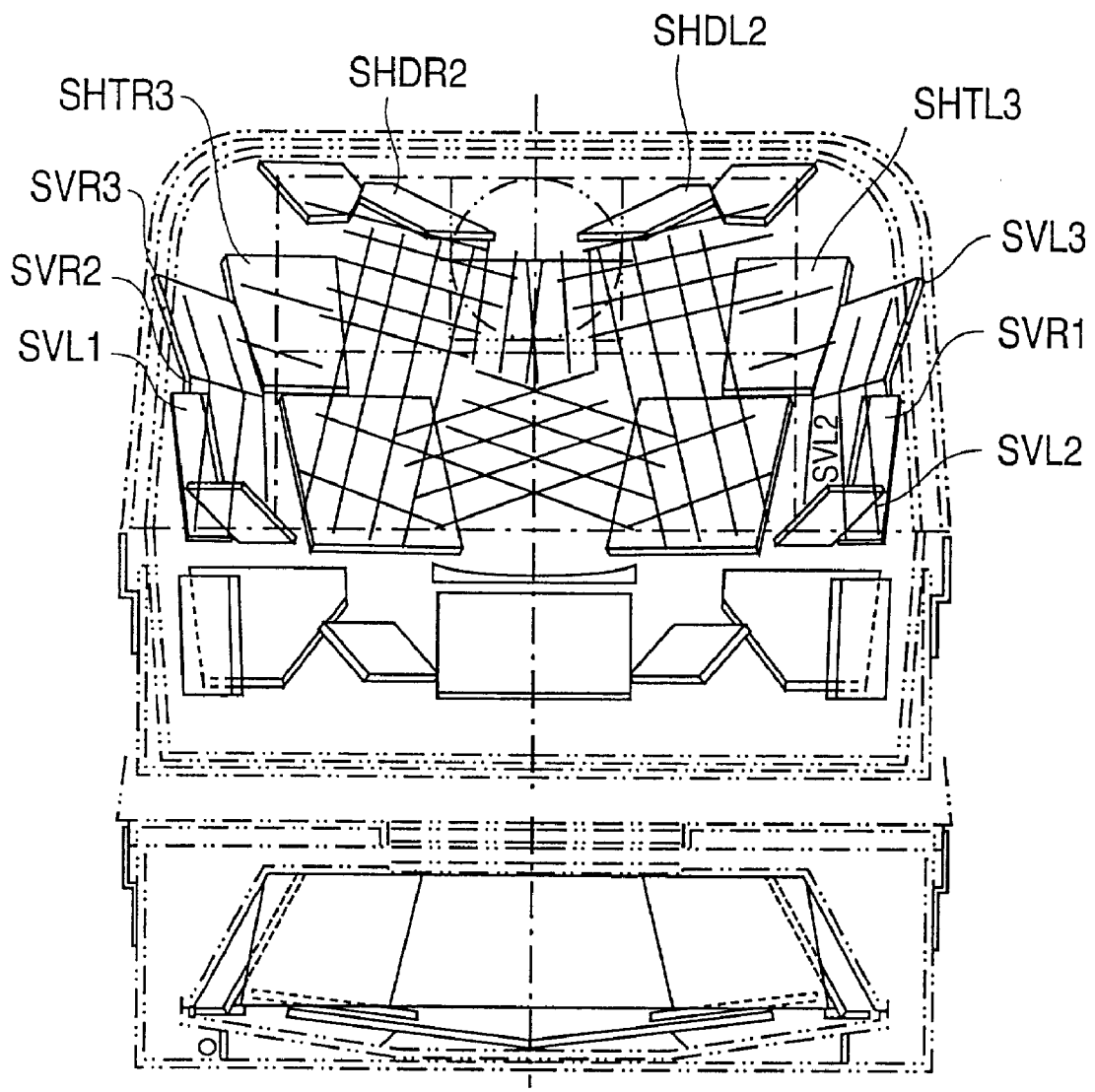
FIG. 21 is a cross-sectional view of a front elevation of an optical scanning apparatus of the third embodiment of the present invention.
Figure 22:
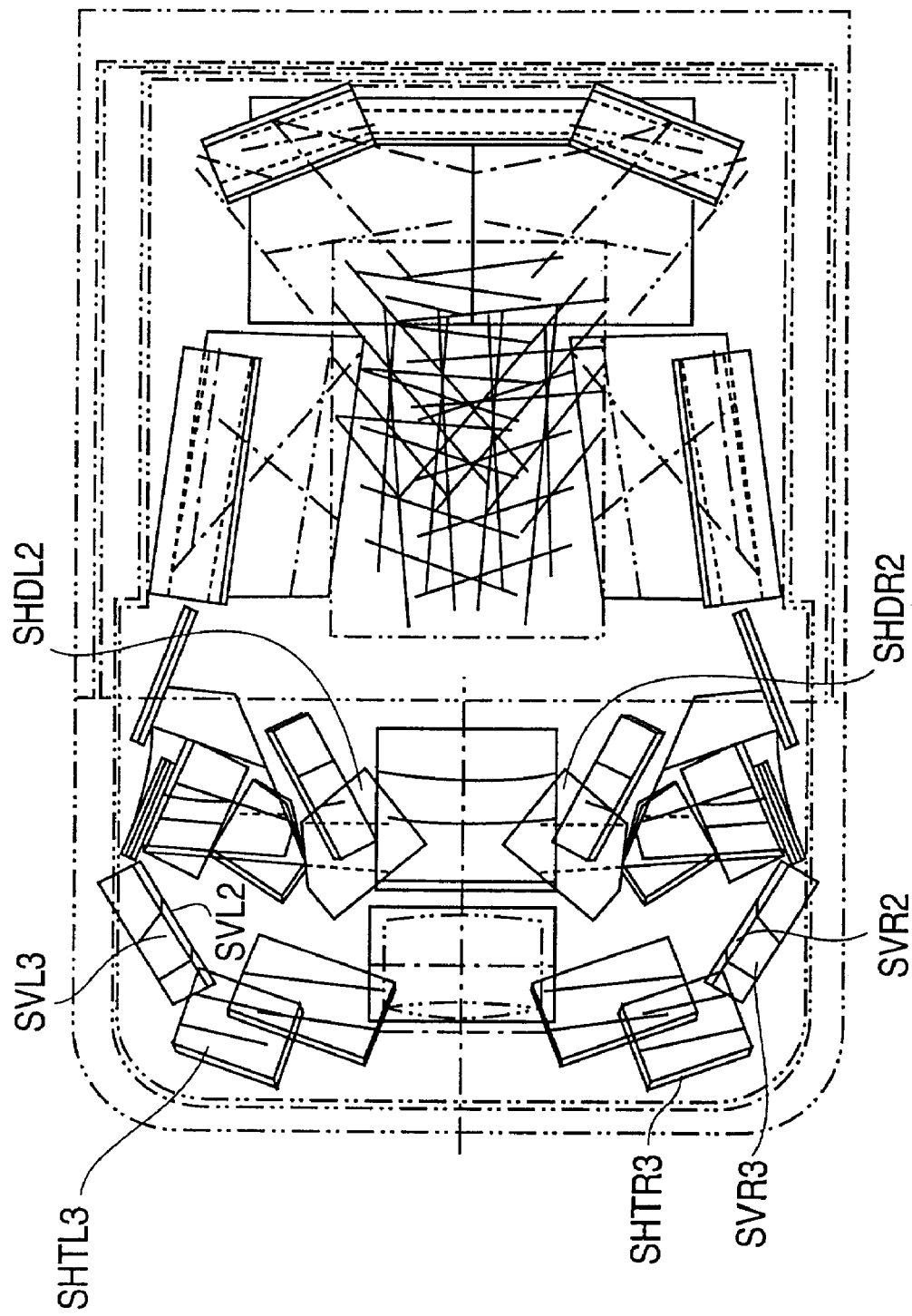
FIG. 22 is a cross-sectional view of an optical scanning apparatus of the third embodiment of the present invention.

FIG. 20 to FIG. 22 illustrate the apparatus of the third embodiment, corresponding to FIG. 1 to FIG. 3, or corresponding to FIG. 13 to FIG. 15.

The apparatus of the third embodiment does not include a hologram at the side window, unlike the apparatus of the first or second embodiments. The side window 80 of the third embodiment is formed of two sheets of glass plates, i.e., external 82 and internal 84 glass plates. Therefore, in this embodiment, the scanning pattern emitted in the horizontal direction from the side window and the scanning pattern emitted to the lower side are generated by changing an arrangement of the pattern mirrors in the apparatus.

In comparison with FIG. 1, for example, the pattern mirror SHTR3(SHTL3) of the apparatus of the third embodiment is tilted for mounting so that the reflecting surface is a directed slightly upward in comparison with the pattern mirror of the same name illustrated in FIG. 1. Moreover, the SVL2/SVR2 mirror of the first embodiment is divided in the present embodiment into SVL2 and SVL3 (SVR2 and SVR3). Here, SVL3 is arranged at the upper side of SVL2. For example, as illustrated in FIG. 21 or FIG. 22, SVL3 is arranged in the tilting angle opening to the outside so that the reflecting surface is directed upward more than that of SVL2.

Figure 23:
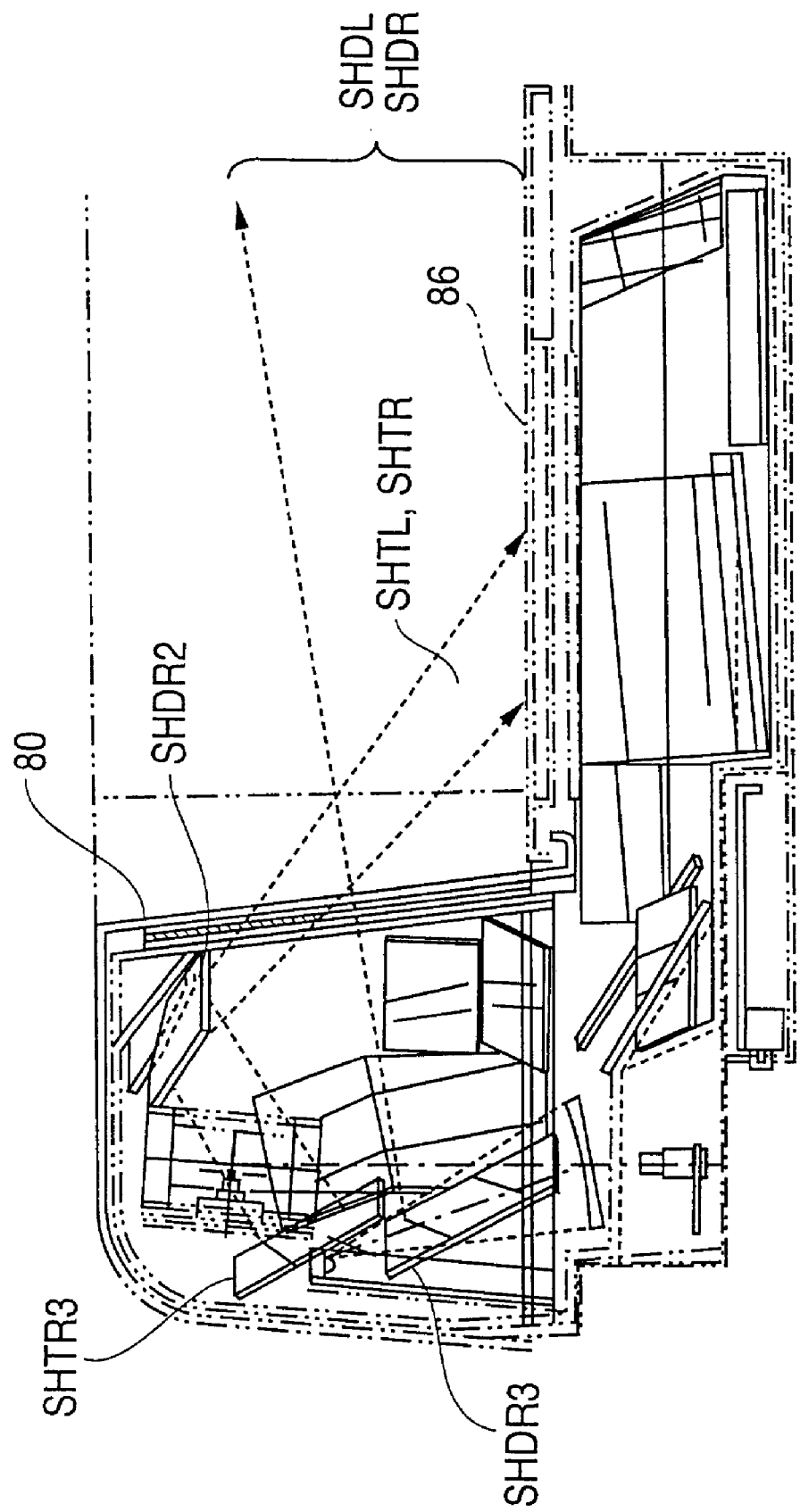
FIG. 23 illustrates an emitting path of the side scanning pattern of the third embodiment.

FIG. 23 illustrates the emitting path of patterns drawing the scanning loci almost in the horizontal direction to the bottom window 86 among the scanning patterns emitted from the side window 80. Like the apparatus in the first or second embodiments, the pattern SHDR is reflected by the pattern mirror SHDR3 and is then emitted from the side window 80 in the horizontal direction.

On the other hand, the patterns SHTR, SHTL are emitted from the side window 80 passing the following path.

SHTR: Polygon-SHR1-SHTR2-SHTR3-SHDR2-side window

SHTL: Polygon-SHL1-SHTL2-SHTL3-SHDL2-side window

The path up to SHTR3 (SHTL3) from the polygon mirror 88 is the same as that of the first/second embodiments. The subsequent emitting path will be explained with reference to FIG. 23.

As explained above, the SHTR3 is tilted slightly upward at its reflecting surface in comparison with the first/second embodiments. Therefore, in comparison with the first/second embodiments, the scanning pattern is reflected upward by SHTR3.

At the area after the scanning pattern reflected by SHTR3, SHDR2 (of which reflecting surface is tilted downward) is arranged and therefore the scanning pattern is incident from the lower side of SHDR2. The scanning pattern SHTR reflected by SHDR2 is emitted in the lower side to the bottom window 86 from the side window 80.

Figure 24:
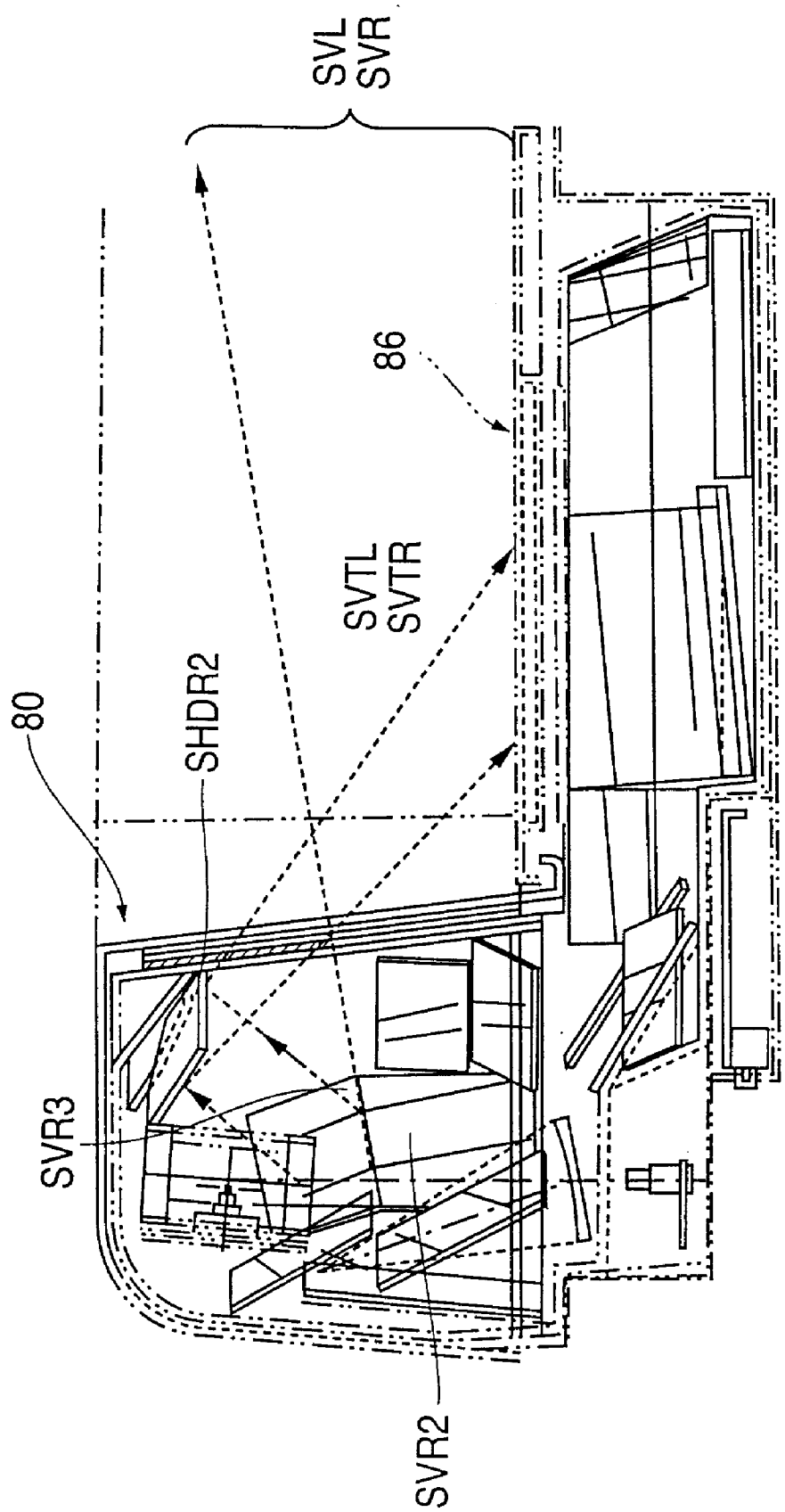
FIG. 24 illustrates an emitting path of the side scanning pattern of the third embodiment.

FIG. 24 illustrates the emitting path of the scanning patterns drawing scanning loci almost in the vertical direction to the bottom window 86 among the scanning patterns emitted from the side window 80. Like the apparatus of the first and second embodiments, the pattern SVR is reflected by the pattern mirror SVR2 and is then emitted almost in the horizontal direction from the side window 86.

On the other hand, the patterns SVTR, SVTL are emitted from the side window 86 passing the following paths.

SVTR: Polygon-SVR1-SVR3-SHDR2-side window

SVTL: Polygon-SVL1-SVL3-SHDL2-side window

Moreover, the emitting path of the scanning pattern will be explained with reference to FIG. 24.

The scanning beam reflected by SVR1 is incident to SVR3 and the reflecting surface of SVR3 is directed upward in comparison with SVR2. Therefore, the beam reflected by SVR3 is emitted upward in comparison with the reflected beam of SVR2.

At the area after the scanning beam reflected by SVR3, the pattern mirror SHDR2 is arranged. As explained above, since SHDR2 is directed downward at its reflecting surface, the scanning beam reflected by SVR3 is reflected to the lower side by SHDR2.

Therefore, the pattern SVTR reflected by SHDR2 is emitted to the lower side from the side window 80 toward the bottom window 86.

In the apparatus of the third embodiment, it is no longer required to provide a hologram. When a hologram is necessary in an apparatus, the manufacturing costs are high, but in the case of the third embodiment, since the hologram is unnecessary, the cost can be lowered by the price of hologram.

As illustrated in the second embodiment, the shape of side window 80 in the third embodiment may be curved like a symbol "<".

It is naturally possible to form the apparatus by combining the hologram of the first/second embodiments and the structure for emitting the scanning pattern to the lower side by arrangement of the mirrors as illustrated in the third embodiment.

Here, in the first or second embodiments, the scanning pattern emitted to the lower side passes the hologram and the scanning pattern emitted almost in the horizontal direction is emitted through the path not passing the hologram. But, it is also possible that the scanning pattern emitted to the lower side does not pass the hologram and the scanning pattern emitted in the horizontal direction is deflected by the hologram or another deflecting means. Moreover, in some cases, both scanning patterns may be deflected by the deflecting means.

Regarding the side window, it is not strictly vertical to the bottom window, but even if the side window is tilted a little, it should be generally considered "vertical" according to the present specification.

As explained above, the apparatus of the present invention is capable of emitting the scanning pattern emitted in the horizontal direction from a window and the scanning pattern emitted in the lower direction. Particularly, the scanning pattern emitted in the lower side is very effective to accurately read the bar code for the commodities which is difficult to be tilted, because such a bar code may be attached on the upper side of, e.g., tray commodities.

As explained above, two kinds of scanning patterns can be emitted from the same window and therefore enlargement of the apparatus can be prevented.

Moreover, since the area where respective scanning patterns are emitted can be divided for the convenience of identification by the user, a user can easily understand the emitting area of the scanning pattern and a more efficient reading operation can be realized.

On the other hand, a deflecting means (hologram, etc.) is provided and thereby at least one scanning pattern is first deflected by this deflecting means and is then emitted. However, with employment of such structure, the desired scanning pattern can be obtained without relation to the number of pattern mirrors and layout thereof provided in the apparatus.

What is claimed is:

1. An optical scanning apparatus, comprising:
   a light source for emitting a light beam;
   scanning means for scanning the light beam emitted from the light source;
   at least one mirror for reflecting the light beam scanned by the scanning means;
   a first horizontal window for emitting a scanning beam reflected by said at least one mirror as a first scanning pattern, said first window being elongated and having a longitudinal axis; and
   a second window installed vertically relative to said first window,
   wherein said first scanning pattern is emitted inwardly in the direction of the second window,
   wherein the scanning beam reflected by said at least one mirror is emitted from the second window as a second scanning pattern different from the first scanning pattern, and
   wherein said second scanning pattern emitted from said second window includes a first pattern which is emitted substantially parallel to said axis of said first window, and a second pattern which is emitted from an upper portion to a lower portion of the apparatus, at an angle to the axis of said first window.

2. An optical scanning apparatus, comprising:
   a light source for emitting a light beam;
   scanning means for generating a scanning beam by scanning the light beam emitted from the light source;
   a vertical window for emitting an indicia scanning pattern based on the scanning beam scanned by said scanning means; and
   a horizontal installation surface having a length extending in a direction away from the vertical window and a longitudinal axis,
   wherein said indicia scanning pattern includes a first scanning pattern emitted substantially parallel to, and in a direction of the axis of, the installation surface of the apparatus, and a second scanning pattern emitted through said vertical window from an upper portion to a lower portion of the apparatus, toward the installation surface.

3. The apparatus as claimed in claim 2, wherein said vertical window is provided with means, separate from the scanning means, for deflecting at least one of said first and second scanning patterns, and
   wherein one of said first and second scanning patterns is deflected by said deflecting means and is then emitted through the vertical window, and the other of said first and second scanning patterns is emitted through the vertical window without passing said deflecting means.

4. The apparatus as claimed in claim 2, wherein said window is provided with a first area where said first scanning pattern passes, and a second area where said second scanning pattern passes, and said first area and said second area are angled relative to each other, so that the first area can be distinguished visually from the second area.

5. The apparatus as claimed in claim 4, wherein said first area and said second area are planar areas arranged so that the first area is substantially perpendicular to the installation surface and the second area is angled toward the installation surface.

6. An optical scanning apparatus for scanning indicia on a commodity through emission of a scanning pattern from a first horizontal window and a second vertical window, including a bottom section having the first window provided in an installation surface of the apparatus, and a side section having the second window, wherein said installation surface has a length extending in a substantially perpendicular direction and a longitudinal axis, comprising:
   a light source for emitting a light beam;
   scanning means with a rotating axis substantially parallel to said axis of said installation surface to scan said light beam;
   a bottom pattern mirror for emitting a first scanning pattern inwardly toward said first window by reflecting a scanning beam generated by said scanning means; and
   a side pattern mirror for emitting a second scanning pattern toward said second window by reflecting the scanning beam generated by said scanning means;

wherein said second window emits, as the second scanning pattern, a first pattern substantially parallel to said axis of the installation surface, and a second pattern from an upper portion to a lower portion of the apparatus toward said first window.

7. The apparatus as claimed in claim 6, wherein said second window is divided into a first area where said first scanning pattern is emitted and a second area where said second scanning pattern is emitted, and wherein the first area is angled relative to the second area to be visually distinguishable from the second area.

8. An optical scanning apparatus, comprising:

a light source for emitting a light beam;

a scanner for scanning the light beam emitted from the light source;

at least one mirror for reflecting the light beam scanned by the scanner;

a first horizontal window for emitting a scanning beam reflected by said at least one mirror as a first scanning pattern, said first window being elongated and having a longitudinal axis; and a second window installed vertically relative to said first window, wherein said first scanning pattern is emitted inwardly in the direction of the second window, wherein the scanning beam reflected by said at least one mirror is emitted by said second window as a second scanning pattern different from the first scanning pattern, and wherein said second scanning pattern emitted from said second window includes a first pattern which is emitted substantially parallel to said axis of said first window, and a second pattern which is emitted from an upper portion to a lower portion of the apparatus, at an angle to the axis of said first window.

9. An optical scanning apparatus, comprising:

a light source for emitting a light beam;

scanning means for generating a scanning beam by scanning the light beam emitted from the light source;

a vertical window for emitting an indicia scanning pattern based on the scanning beam scanned by said scanner; and a horizontal installation surface having a length extending in a direction away from the vertical window and a longitudinal axis, wherein said indicia scanning pattern includes a first scanning pattern emitted substantially parallel to, and in a direction of the axis of the installation surface of the apparatus, and a second scanning pattern emitted through said vertical window from an upper portion to a lower portion of the apparatus, toward the installation surface.

10. The apparatus as claimed in claim 9, wherein said vertical window is provided with a hologram for deflecting at least one of said first and second scanning patterns, and wherein one of said first and second scanning patterns is deflected by said hologram, separate from the scanning means, and is then emitted through the vertical window, and the other of said first and second scanning patterns is emitted through the vertical window without passing said hologram.

11. The apparatus as claimed in claim 9, wherein said vertical window is provided with a first area where said first scanning pattern passes, and a second area where said second scanning pattern passes, and said first area and said second area are angled relative to each other, so that the first area can be distinguished visually from the second area.

12. The apparatus as claimed in claim 11, wherein said first area and said second area are planar areas arranged so that the first area is substantially perpendicular to the installation surface and the second area is angled toward the installation surface.

13. An optical scanning apparatus for scanning indicia on a commodity through emission of a scanning pattern from a first horizontal window and a second vertical window, including a bottom section having the first window provided in an installation surface of the apparatus, and a side section having the second window, wherein said installation surface has a length extending in a substantially perpendicular direction and a longitudinal axis, comprising:

a light source for emitting a light beam;

a scanner with a rotating axis substantially parallel to said axis of said installation surface to scan said light beam;

a bottom pattern mirror for emitting a first scanning pattern inwardly toward said first window by reflecting a scanning beam generated by said scanner; and a side pattern mirror for emitting a second scanning pattern toward said second window by reflecting the scanning beam generated by said scanner;

wherein said second window emits, as the second scanning pattern, a first pattern substantially parallel to said axis of the installation surface, and a second pattern from an upper portion to a lower portion of the apparatus toward said first window.

14. The apparatus as claimed in claim 13, wherein said second window is divided into a first area where said first scanning pattern is emitted and a second area where said second scanning pattern is emitted, and wherein the first area is angled relative to the second area to be visually distinguishable from the second area.

15. An optical scanning apparatus, comprising:

a light source for emitting a light beam;

scanning means for scanning the light beam emitted from the light source;

at least one mirror for reflecting the light beam scanned by the scanning means;

a first horizontal window for emitting a scanning beam reflected by said at least one mirror as a first scanning pattern, said first window being elongated and having a longitudinal axis; and a second window installed vertically relative to said first window, wherein said first scanning pattern is emitted inwardly in the direction of the second window, wherein the scanning beam reflected by said at least one mirror is emitted from the second window as a second scanning pattern different from the first scanning pattern, and wherein said second scanning pattern emitted from said second window includes a first pattern which is emitted substantially parallel to said axis of said first window, a second pattern which is emitted from an upper portion to a lower portion of the apparatus, at an angle to the axis of said first window, and a third pattern which is substantially perpendicular to the horizontal window.

16. An optical scanning apparatus, comprising:

a light source for emitting a light beam;

scanning means for generating a scanning beam by scanning the light beam emitted from the light source;

a vertical window for emitting an indicia scanning pattern based on the scanning beam scanned by said scanning means; and a horizontal installation surface having a length extending in a direction away from the vertical window and a longitudinal axis, wherein said indicia scanning pattern includes a first scanning pattern emitted substantially parallel to, and in a direction of the axis of, the installation surface of the apparatus, a second scanning pattern emitted through said vertical window from an upper portion to a lower portion of the apparatus, toward the installation surface, and a third pattern which is substantially perpendicular to the horizontal installation surface.

17. An optical scanning apparatus for scanning indicia on a commodity through emission of a scanning pattern from a first horizontal window and a second vertical window, including a bottom section having the first window provided in an installation surface of the apparatus, and a side section having the second window, wherein said installation surface has a length extending in a substantially perpendicular direction and a longitudinal axis, comprising:

a light source for emitting a light beam;

scanning means with a rotating axis substantially parallel to said axis of said installation surface to scan said light beam;

a bottom pattern mirror for emitting a first scanning pattern inwardly toward said first window by reflecting a scanning beam generated by said scanning means; and a side pattern mirror for emitting a second scanning pattern toward said second window by reflecting the scanning beam generated by said scanning means;

wherein said second window emits, as the second scanning pattern, a first pattern substantially parallel to said axis of the installation surface, a second pattern from an upper portion to a lower portion of the apparatus toward said first window, and a third pattern which is substantially perpendicular to the horizontal installation surface.

18. An optical scanning apparatus, comprising:

a light source for emitting a light beam;

a scanner for scanning the light beam emitted from the light source;

at least one mirror for reflecting the light beam scanned by the scanner;

a first horizontal window for emitting a scanning beam reflected by said at least one mirror as a first scanning pattern, said first window being elongated and having a longitudinal axis; and a second window installed vertically relative to said first window, wherein said first scanning pattern is emitted inwardly in the direction of the second window, wherein the scanning beam reflected by said at least one mirror is emitted by said second window as a second scanning pattern is different from the first scanning pattern, and wherein said second scanning pattern emitted from said second window includes a first pattern which is emitted substantially parallel to said axis of said first window, a second pattern which is emitted from an upper portion to a lower portion of the apparatus, at an angle to the axis of said first window, and a third pattern which is substantially perpendicular to the horizontal window.

19. An optical scanning apparatus, comprising:

a light source for emitting a light beam;

scanning means for generating a scanning beam by scanning the light beam emitted from the light source;

a vertical window for emitting an indicia scanning pattern based on the scanning beam scanned by said scanner; and a horizontal installation surface having a length extending in a direction away from the vertical window and a longitudinal axis, wherein said indicia scanning pattern includes a first scanning pattern emitted substantially parallel to, and in a direction of the axis of the installation surface of the apparatus, a second scanning pattern emitted through said vertical window from an upper portion to a lower portion of the apparatus, toward the installation surface, and a third pattern which is substantially perpendicular to the horizontal installation surface.

20. An optical scanning apparatus for scanning indicia on a commodity through emission of a scanning pattern from a first horizontal window and a second vertical window, including a bottom section having the first window provided in an installation surface of the apparatus, and a side section having the second window, wherein said installation surface has a length extending in a substantially perpendicular direction and a longitudinal axis, comprising:

a light source for emitting a light beam;

a scanner with a rotating axis substantially parallel to said axis of said installation surface to scan said light beam;

a bottom pattern mirror for emitting a first scanning pattern inwardly toward said first window by reflecting a scanning beam generated by said scanner; and a side pattern mirror for emitting a second scanning pattern toward said second window by reflecting the scanning beam generated by said scanner;

wherein said second window emits, as the second scanning pattern, a first pattern substantially parallel to said axis of the installation surface, a second pattern from an upper portion to a lower portion of the apparatus toward said first window, and a third pattern which is substantially perpendicular to the horizontal window.

21. An optical scanning apparatus, comprising:

a light source for emitting a light beam;

scanning means for scanning the light beam emitted from the light source;

at least one mirror for reflecting the light beam scanned by the scanning means;

a first window for emitting a scanning beam reflected by said at least one mirror as a first scanning pattern, said first window being elongated and having a longitudinal axis; and a second window installed at an angle relative to said first window, wherein said first scanning pattern is emitted inwardly in the direction of the second window, wherein the scanning beam reflected by said at least one mirror is emitted from the second window as a second scanning pattern different from the first scanning pattern, and wherein said second scanning pattern emitted from said second window includes a first pattern which is emitted substantially parallel to said axis of said first window, and a second pattern which is emitted from an upper portion to a lower portion of the apparatus, at an angle to the axis of said first window.

22. An optical scanning apparatus, comprising:

a light source for emitting a light beam;

scanning means for generating a scanning beam by scanning the light beam emitted from the light source;

a window for emitting an indicia scanning pattern based on the scanning beam scanned by said scanning means; and an installation surface positioned at an angle relative to the window, having a length extending in a direction away from the window and a longitudinal axis, wherein said indicia scanning pattern includes a first scanning pattern emitted substantially parallel to, and in a direction of the axis of, the installation surface of the apparatus, and a second scanning pattern emitted through said window from an upper portion to a lower portion of the apparatus, toward the installation surface.

23. The apparatus as claimed in claim 22, wherein said vertical window is provided with means, separate from the scanning means, for deflecting at least one of said first and second scanning patterns, and wherein one of said first and second scanning patterns is deflected by said deflecting means and is then emitted through the vertical window, and the other of said first and second scanning patterns is emitted through the vertical window without passing said deflecting means.

24. The apparatus as claimed in claim 22, wherein said second window is provided with a first area where said first scanning pattern passes, and a second area where said second scanning pattern passes, and said first area and said second area are angled relative to each other, so that the first area can be distinguished visually from the second area.

25. The apparatus as claimed in claim 24, wherein said first area and said second area are planar areas arranged so that the first area is substantially perpendicular to the installation surface and the second area is angled toward the installation surface.

26. An optical scanning apparatus for scanning indicia on a commodity through emission of a scanning pattern from a first window and a second window positioned at an angle relative to the first window, including a bottom section having the first window provided in an installation surface of the apparatus, and a side section having the second window, wherein said installation surface has a length extending in a substantially perpendicular direction and a longitudinal axis, comprising:

a light source for emitting a light beam;

scanning means with a rotating axis substantially parallel to said axis of said installation surface to scan said light beam;

a bottom pattern mirror for emitting a first scanning pattern inwardly toward said first window by reflecting a scanning beam generated by said scanning means; and a side pattern mirror for emitting a second scanning pattern toward said second window by reflecting the scanning beam generated by said scanning means;

wherein said second window emits, as the second scanning pattern, a first pattern substantially parallel to said axis of the installation surface, and a second pattern from an upper portion to a lower portion of the apparatus toward said first window.

27. The apparatus as claimed in claim 26, wherein said second window is divided into a first area where said first scanning pattern is emitted and a second area where said second scanning pattern is emitted, and wherein the first area is angled relative to the second area to be visually distinguishable from the second area.

28. An optical scanning apparatus, comprising:

a light source for emitting a light beam;

a scanner for scanning the light beam emitted from the light source;

at least one mirror for reflecting the light beam scanned by the scanner;

a first window for emitting a scanning beam reflected by said at least one mirror as a first scanning pattern, said first window being elongated and having a longitudinal axis; and a second window installed at an angle relative to said first window, wherein said first scanning pattern is emitted inwardly in the direction of the second window, wherein the scanning beam reflected by said at least one mirror is emitted by said second window as a second scanning pattern different from the first scanning pattern, and wherein said second scanning pattern emitted from said second window includes a first pattern which is emitted substantially parallel to said axis of said first window, and a second pattern which is emitted from an upper portion to a lower portion of the apparatus, at an angle to the axis of said first window.

29. An optical scanning apparatus, comprising:

a light source for emitting a light beam;

scanning means for generating a scanning beam by scanning the light beam emitted from the light source;

a window for emitting an indicia scanning pattern based on the scanning beam scanned by said scanner; and an installation surface positioned at an angle relative to the window, having a length extending in a direction away from the window and a longitudinal axis, wherein said indicia scanning pattern includes a first scanning pattern emitted substantially parallel to, and in a direction of the axis of the installation surface of the apparatus, and a second scanning pattern emitted through said window from an upper portion to a lower portion of the apparatus, toward the installation surface.

30. The apparatus as claimed in claim 29, wherein said vertical window is provided with a hologram for deflecting at least one of said first and second scanning patterns, and wherein one of said first and second scanning patterns is deflected by said hologram, separate from the scanning means, and is then emitted through the vertical window, and the other of said first and second scanning patterns is emitted through the vertical window without passing said hologram.

31. The apparatus as claimed in claim 29, wherein said vertical window is provided with a first area where said first scanning pattern passes, and a second area where said second scanning pattern passes, and said first area and said second area are angled relative to each other, so that the first area can be distinguished visually from the second area.

32. The apparatus as claimed in claim 31, wherein said first area and said second area are planar areas arranged so that the first area is substantially perpendicular to the installation surface and the second area is angled toward the installation surface.

33. An optical scanning apparatus for scanning indicia on a commodity through emission of a scanning pattern from a first window and a second window positioned at an angle relative to the first window, including a bottom section having the first window provided in an installation surface of the apparatus, and a side section having the second window, wherein said installation surface has a length extending in a substantially perpendicular direction and a longitudinal axis, comprising:

a light source for emitting a light beam;

a scanner with a rotating axis substantially parallel to said axis of said installation surface to scan said light beam;

a bottom pattern mirror for emitting a first scanning pattern inwardly toward said first window by reflecting a scanning beam generated by said scanner; and a side pattern mirror for emitting a second scanning pattern toward said second window by reflecting the scanning beam generated by said scanner;

wherein said second window emits, as the second scanning pattern, a first pattern substantially parallel to said axis of the installation surface, and a second pattern from an upper portion to a lower portion of the apparatus toward said first window.

34. The apparatus as claimed in claim 33, wherein said second window is divided into a first area where said first scanning pattern is emitted and a second area where said second scanning pattern is emitted, and wherein the first area is angled relative to the second area to be visually distinguishable from the second area.

35. An optical scanning apparatus, comprising:

a light source for emitting a light beam;

scanning means for scanning the light beam emitted from the light source;

at least one mirror for reflecting the light beam scanned by the scanning means;

a first window for emitting a scanning beam reflected by said at least one mirror as a first scanning pattern, said first window being elongated and having a longitudinal axis; and a second window installed at an angle relative to said first window, wherein said first scanning pattern is emitted inwardly in the direction of the second window, wherein the scanning beam reflected by said at least one mirror is emitted from the second window as a second scanning pattern different from the first scanning pattern, and wherein said second scanning pattern emitted from said second window includes a first pattern which is emitted substantially parallel to said axis of said first window, a second pattern which is emitted from an upper portion to a lower portion of the apparatus, at an angle to the axis of said first window, and a third pattern which is substantially perpendicular to the horizontal window.

36. An optical scanning apparatus, comprising:

a light source for emitting a light beam;

scanning means for generating a scanning beam by scanning the light beam emitted from the light source;

a window for emitting an indicia scanning pattern based on the scanning beam scanned by said scanning means; and an installation surface positioned at an angle relative to the window, having a length extending in a direction away from the window and a longitudinal axis, wherein said indicia scanning pattern includes a first scanning pattern emitted substantially parallel to, and in a direction of the axis of, the installation surface of the apparatus, a second scanning pattern emitted through said window from an upper portion to a lower portion of the apparatus, toward the installation surface, and a third pattern which is substantially perpendicular to the horizontal installation surface.

37. An optical scanning apparatus for scanning indicia on a commodity through emission of a scanning pattern from a first window and a second window positioned at an angle relative to the first window, including a bottom section having the first window provided in an installation surface of the apparatus, and a side section having the second window, wherein said installation surface has a length extending in a substantially perpendicular direction and a longitudinal axis, comprising:

a light source for emitting a light beam;

scanning means with a rotating axis substantially parallel to said axis of said installation surface to scan said light beam;

a bottom pattern mirror for emitting a first scanning pattern inwardly toward said first window by reflecting a scanning beam generated by said scanning means; and a side pattern mirror for emitting a second scanning pattern toward said second window by reflecting the scanning beam generated by said scanning means;

wherein said second window emits, as the second scanning pattern, a first pattern substantially parallel to said axis of the installation surface, a second pattern from an upper portion to a lower portion of the apparatus toward said first window, and a third pattern which is substantially perpendicular to the horizontal installation surface.

38. An optical scanning apparatus, comprising:

a light source for emitting a light beam;

a scanner for scanning the light beam emitted from the light source;

at least one mirror for reflecting the light beam scanned by the scanner;

a first window for emitting a scanning beam reflected by said at least one mirror as a first scanning pattern, said first window being elongated and having a longitudinal axis; and a second window installed at an angle relative to said first window, wherein said first scanning pattern is emitted inwardly in the direction of the second window, wherein the scanning beam reflected by said at least one mirror is emitted by said second window as a second scanning pattern is different from the first scanning pattern, and wherein said second scanning pattern emitted from said second window includes a first pattern which is emitted substantially parallel to said axis of said first window, a second pattern which is emitted from an upper portion to a lower portion of the apparatus, at an angle to the axis of said first window, and a third pattern which is substantially perpendicular to the horizontal window.

39. An optical scanning apparatus, comprising:

a light source for emitting a light beam;

scanning means for generating a scanning beam by scanning the light beam emitted from the light source;

a window for emitting an indicia scanning pattern based on the scanning beam scanned by said scanner; and an installation surface positioned at an angle relative to the window, having a length extending in a direction away from the window and a longitudinal axis, wherein said indicia scanning pattern includes a first scanning pattern emitted substantially parallel to, and in a direction of the axis of the installation surface of the apparatus, a second scanning pattern emitted through said window from an upper portion to a lower portion of the apparatus, toward the installation surface, and a third pattern which is substantially perpendicular to the horizontal installation surface.

40. An optical scanning apparatus for scanning indicia on a commodity through emission of a scanning pattern from a first window and a second window positioned at an angle relative to the second window, including a bottom section having the first window provided in an installation surface of the apparatus, and a side section having the second window, wherein said installation surface has a length extending in a substantially perpendicular direction and a longitudinal axis, comprising:

a light source for emitting a light beam;

a scanner with a rotating axis substantially parallel to said axis of said installation surface to scan said light beam;

a bottom pattern mirror for emitting a first scanning pattern inwardly toward said first window by reflecting a scanning beam generated by said scanner; and a side pattern mirror for emitting a second scanning pattern toward said second window by reflecting the scanning beam generated by said scanner;

wherein said second window emits, as the second scanning pattern, a first pattern substantially parallel to, said axis of the installation surface, a second pattern from an upper portion to a lower portion of the apparatus toward said first window, and a third pattern which is substantially perpendicular to the horizontal window.

* * * * *